(12) United States Patent
Bergquist

(10) Patent No.: US 11,082,933 B2
(45) Date of Patent: Aug. 3, 2021

(54) METHOD FOR REDEFINING A TIME ALIGNMENT TIMER OF A WIRELESS COMMUNICATION NETWORK, CORRESPONDING USER EQUIPMENT AND NETWORK NODE

(71) Applicant: Telefonaktiebolaget LM Ericsson (publ), Stockholm (SE)

(72) Inventor: Gunnar Bergquist, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 449 days.

(21) Appl. No.: 15/779,207

(22) PCT Filed: Oct. 10, 2016

(86) PCT No.: PCT/SE2016/050976
§ 371 (c)(1),
(2) Date: May 25, 2018

(87) PCT Pub. No.: WO2017/095293
PCT Pub. Date: Jun. 8, 2017

(65) Prior Publication Data
US 2020/0305097 A1    Sep. 24, 2020

Related U.S. Application Data

(60) Provisional application No. 62/260,934, filed on Nov. 30, 2015.

(51) Int. Cl.
*H04W 76/28* (2018.01)
*H04W 56/00* (2009.01)
(Continued)

(52) U.S. Cl.
CPC .......... *H04W 56/001* (2013.01); *H04W 4/12* (2013.01); *H04W 76/27* (2018.02); *H04W 76/28* (2018.02); *H04W 80/02* (2013.01)

(58) Field of Classification Search
CPC .......... H04W 72/0413; H04W 72/048; H04W 74/006; H04W 76/00; H04W 76/27;
(Continued)

(56) References Cited

U.S. PATENT DOCUMENTS 9,603,184 B2 *   3/2017   Tabet ..................... H04W 76/28
10,034,312 B2 *  7/2018   Lee ........................ H04L 5/0053
(Continued)

FOREIGN PATENT DOCUMENTS

CN    102781073 A    11/2012

OTHER PUBLICATIONS

PCT International Search Report for International application No. PCT/SE2016/050976—dated Jan. 17, 2017.
(Continued)

*Primary Examiner* — Jean A Gelin
(74) *Attorney, Agent, or Firm* — Baker Botts, LLP

(57) ABSTRACT

Methods and devices for redefining a time alignment timer of a wireless communication network include determining that a Radio Resource Control, RRC, connection from the UE to a network node is operating in Connected Discontinuous Reception, CDRX, mode. In response to determining that the RRC connection is operating in CDRX mode, an initial message include a Protocol Feature Type, PFT, and a User Equipment Type and Software Version Number, UE-TSVN is transmitted, to the network node. In response to the initial message, a handshake message including the PFT, a downlink Protocol Message Type, PMT, indicating a Time Alignment Timer Definition, TATDEF, message type, and a Protocol Message Body, PMB, associated with the TATDEF message type that including one or more values for redefining a time alignment timer is received from the network node.

25 Claims, 36 Drawing Sheets

(51) Int. Cl.
*H04W 80/02* (2009.01)
*H04W 4/12* (2009.01)
*H04W 76/27* (2018.01)

(58) Field of Classification Search
CPC ..... H04W 56/001; H04W 4/12; H04W 76/28; H04W 80/02
See application file for complete search history.

(56) References Cited

U.S. PATENT DOCUMENTS

| | | | | |
|---|---|---|---|---|
| 2009/0100128 | A1* | 4/2009 | Czechowski, III | H04L 67/1076 709/203 |
| 2010/0118752 | A1* | 5/2010 | Suzuki | H04W 76/27 370/311 |
| 2010/0284376 | A1* | 11/2010 | Park | H04W 56/0045 370/336 |
| 2010/0317345 | A1 | 12/2010 | Futaki et al. | |
| 2012/0155309 | A1* | 6/2012 | Bae | H04W 36/0083 370/252 |
| 2013/0170415 | A1 | 7/2013 | Fukuta et al. | |
| 2013/0195049 | A1* | 8/2013 | Yang | H04W 72/04 370/329 |
| 2014/0334389 | A1* | 11/2014 | Abdel-Samad | H04W 76/30 370/329 |
| 2015/0117287 | A1* | 4/2015 | Kim | H04W 52/0241 370/311 |
| 2016/0094358 | A1* | 3/2016 | Won | H04L 12/1881 370/230 |
| 2016/0127994 | A1* | 5/2016 | Cho | H04W 76/28 370/311 |
| 2018/0014347 | A1* | 1/2018 | Nagasaka | H04W 52/0225 |
| 2018/0176979 | A1* | 6/2018 | Ryu | H04W 4/70 |

OTHER PUBLICATIONS

PCT Written Opinion of the Intenraitonal Searching Authority for International application No. PCT/SE2016/050976—dated Jan. 17, 2017.
3GPP TSG GERAN1-GERAN2 Adhoc#1 on FS_IoT_LC; Sophia-Antipolis, France; Source: Huawei Technologies Co., Ltd., HiSilicon Technologies Co., Ltd.; Agenda Item: 1,4.3.3; NB M2M—Uplink Synchronization (GPC-150032)—Feb. 2-5, 2015.
3GPP TSG-RAN2 Meeting #64bis; Ljubljana, Slovenia; Change Request; Title: Usage of RRC Parameters; Source to WG: Nokia Siemens Networks, Nokia Corporation; Source to TSG: R2 (R2-090151)—Jan. 12-16, 2009.
Notification to Grant Patent Right for Invention issued by the China National Intellectual Property Administration for Application or Patent No. 201680069608.7—dated Jun. 3, 2020.
Chinese Office Action issued for Chinese Patent Application No. 201680069608.7 (English Summary attached)—dated Mar. 30, 2020.
Extended European Search Report issued for Application No. EP 19 21 4775—dated Mar. 6, 2020.
Examination Report issued by the Intellectual Property India for Application No. 201847023945—dated Sep. 15, 2020.

* cited by examiner

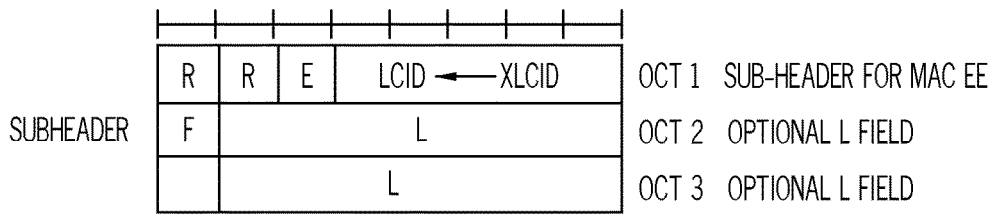
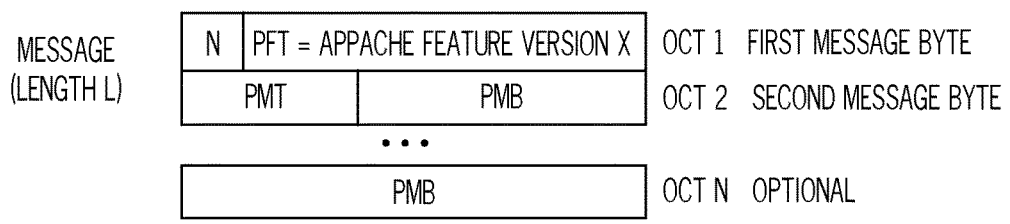
FIG. 1
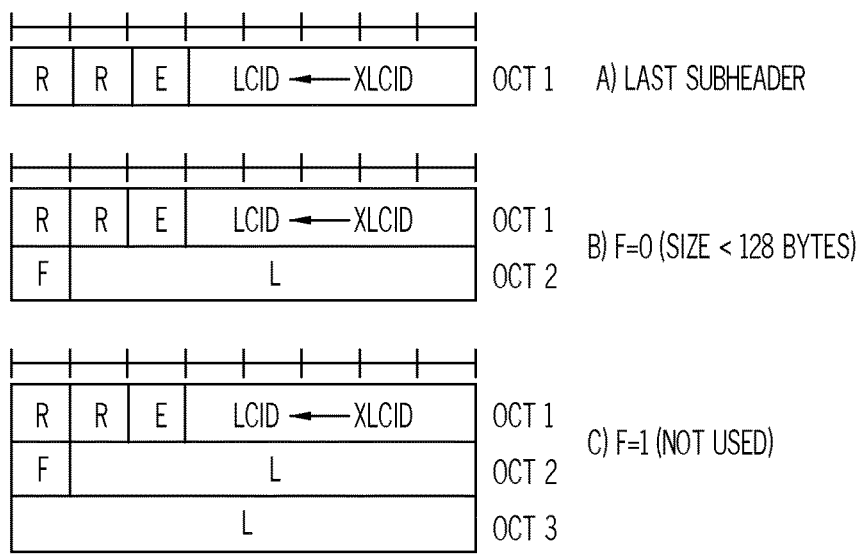
FIG. 2

|   |   |
|---|---|
| 0 \| PFT | OCT 1 |
| UE-TSVN | OCT 2 |
| CAPABILITIES | OCT 3 |

FIG. 3

| | |
|---|---|
| 0000000-0000111 | RESERVED |
| 0001000 | APPACHE DRX SWITCHING |
| 0001001-1111111 | RESERVED |

FIG. 4

|   |   |
|---|---|
| 0 \| PFT | OCT 1 |
| OPTIONS | OCT 2 |
| PMT = 000 \| PMB | OCT 3 |

HANDSHAKE MESSAGE

FIG. 5

| PMT | MESSAGE TYPE |
|---|---|
| 000 | TATDEF |
| 001 | SWITCH |
| 010 | INS-CONFIG |
| 011-111 | RESERVED |
FIG. 6
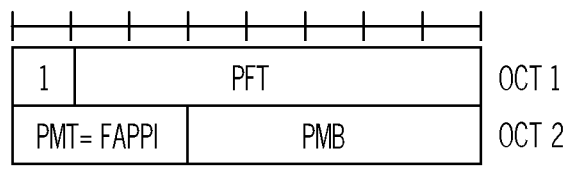
FIG. 7
| PMT | MESSAGE TYPE |
|---|---|
| 000 | RESERVED |
| 001 | FAPPI |
| 010-111 | RESERVED |
FIG. 8
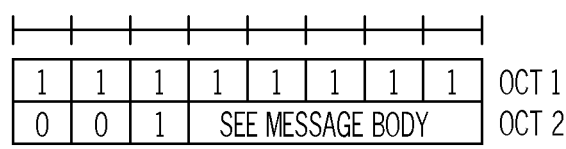
FIG. 9

| INDEX | PFT PROHIBIT TIMER |
|---|---|
| 00 | RESERVED |
| 01 | LDC |
| 10-11 | RESERVED |
FIG. 10
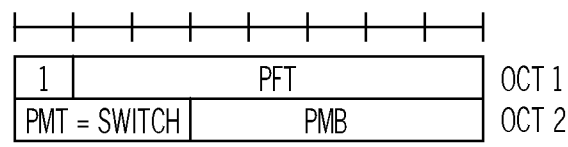
FIG. 11
| PMT | MESSAGE TYPE |
|---|---|
| 000 | TATDEF |
| 001 | SWITCH |
| 010 | INS-CONFIG |
| 011-111 | RESERVED |
FIG. 12
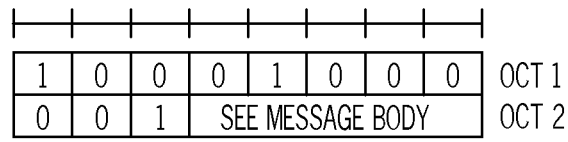
FIG. 13

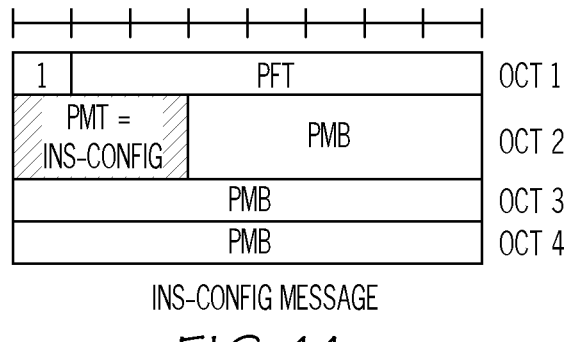
FIG. 14
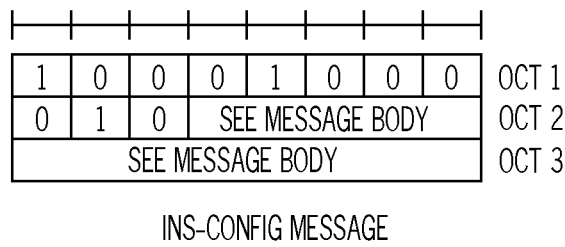
FIG. 15
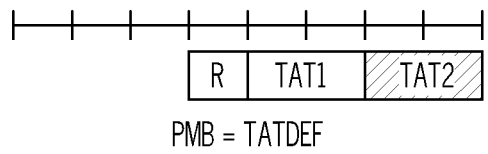
FIG. 16
FIG. 17

| SINGLE TAT | | |
|---|---|---|
| TAT1 | TAT2 | TAT (PC=X) |
| 00 | 00 | SF1280 |
| 01 | 00 | SF2560 |
| 10 | 00 | SF5120 |
| 11 | 00 | SF10240 |
| OTHER COMBINATIONS ARE RESERVED | | |
| 11 | 11 | DEFAULT |

| DOUBLE TAT | | | |
|---|---|---|---|
| TAT1 | TAT2 | SHORT-TAT (PC=X OR PC=1) | LONG-TAT (PC=0) |
| 00 | 01 | SF1280 | SF2560 |
| 00 | 10 | SF1280 | SF5120 |
| 00 | 11 | SF1280 | SF10240 |
| 01 | 10 | SF2560 | SF5120 |
| 01 | 11 | SF2560 | SF10240 |
| 10 | 11 | SF5120 | SF10240 |
| OTHER COMBINATIONS ARE RESERVED | | | |
| 11 | 11 | DEFAULT | |

FIG. 18

| DC 9) | DC-INS values (TAT is running) 1) | | | | DC-oos values (TAT has expired) 2) | | | | |
|---|---|---|---|---|---|---|---|---|---|
| | | | | | I-DRX (EARLY CIAT EXPIRY) | | | | |
| 4)-8) | ODT | DIAT | DRT | LDC | SDC | ODT | DIAT | DRT | LDC | SDC |
| 1 | psf10 | psf10 | psf4 | sf320 | | | | | | |
| 2 | psf10 | psf10 | psf4 | sf640 | | | | | | |
| 3 | psf10 | psf10 | psf4 | sf1280 | | psf2 | psf200 a) | psf2 | psf1280 | - |
| 4 | psf10 | psf100 | psf4 | sf320 | | | | | | |
| 5 | psf10 | psf100 | psf4 | sf640 | | | | | | |
| 6 | psf10 | psf100 | psf4 | sf1280 | | | | | | 8) |
| 7 | | | | | Reserved | | | | | |
| 8 | | | | | Reserved | | | | | |
| 9 | | | | | Reserved | | | | | |
| 10 | | | | | Reserved | | | | | |
| 11 | | | | | | | | | | |
| 12 | psf2 | psf5 | psf2 | sf1280 | | psf2 | psf5 | psf2 | sf1280 | 8) |
| 13 | EARLY DIAT EXPIRY | | | | | Reserved | | | | |
| 14 | PFT SUSPEND (C-DRX) 3) | | | | | | | | | |
| 15 | PFT RELEASE (C-DRX) 3) | | | | | | | | | |

FIG. 21

| DT | $1 \leq DC \geq 12, DC=14$ [1] | DC=0, 13, 15 |
|---|---|---|
| 0 | Less Delay Tolerant | RESERVED |
| 1 | Delay Tolerant [2] | RESERVED |

PMB = SWITCH

| DC 9) | DC-INS values (TAT is running)1) | | | | Reserved | DC-oos values (TAT is expired)2) | | | |
|---|---|---|---|---|---|---|---|---|---|
| | ODT | DIAT | DRT | LDC | SDC | ODT | DIAT | DRT | LDC | SDC |
| 0 | | | | | Reserved | | | | | |
| 4)-8) | ODT | DIAT | DRT | LDC | SDC | ODT | DIAT | DRT | LDC | SDC |
| 1 | | | | | | | | | | |
| 2 | | | | | | | | | | |
| 3 | | | | | | | | | | |
| 4 | | | | | The same coding as used for FAPPI | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |
| 11 | | | | | | | | | | |
| 12 | | | | | | | | | | |
| 13 | Reserved | | | | | | | | | |
| 14 | | | | | | | | | | |
| 15 | | | | | | | | | | |

FIG. 24

| PC | 1 ≤ DC ≥ 12, DC=14 | DC=0, 13, 15 |
|---|---|---|
| 0 | INS | RESERVED |
| 1 | OOS | RESERVED |

FIG. 25

| DRX Timers | Intended UE behaviour ([x,y] means including subframe x and y) |
|---|---|
| onDurationTimer | The MAC entity monitors PDCCH in PDCCH-subframes during the subrframes [n, n+m-1]. |

FIG. 26

DSR-INDEX1 AND DSR-INDEX2 FIELDS IN INS-CONFIG ON DL-DCH

| DSR-INDEX1 | $n^{(1,\tilde{p})}_{PUCCH,SRI}$ |
|---|---|
| 0 | 0 |
| 1 | 1 |
| 2 | 2 |
| ... | ... |
| 2047 | 2047 |

| DSR-INDEX2 | $SR$ | PERIODICITY | OFFSET,SR |
|---|---|---|---|
| 0 - 4 | 0 - 4 | 5 | $SR$ |
| 5 - 14 | 5 - 14 | 10 | $SR$ 5 |
| 15 - 34 | 15 - 34 | 20 | $SR$ 15 |
| 35 - 74 | 35 - 74 | 40 | $SR$ 35 |
| 75 - 154 | 75 - 154 | 80 | $SR$ 75 |
| 155 - 156 | 155 - 156 | 2 | $SR$ 155 |
| 157 | 157 | 1 | $SR$ 157 |

| TAT | CIAT |
|---|---|
| sf1280 | 10 s |
| sf2560 | 10 s |
| sf5120 | 10 s |
| sf10240 | 30 s |
| default | default |

|   |   |   |   |   |   |   |   |       |
|---|---|---|---|---|---|---|---|-------|
| 1 | 0 | 0 | 0 | 1 | 0 | 0 | 0 | OCT 1 |
| PMT= FAPPI | | | 1 | 1 | 1 | 1 | R | OCT 2 |

FIG. 48

| INDEX 2) | DC VALUES 1) |
|----------|--------------|
| 1111 | PFT RELEASE (C-DRX) |

FIG. 49

|   |   |   |   |   |   |   |   |       |
|---|---|---|---|---|---|---|---|-------|
| 1 | 0 | 0 | 0 | 1 | 0 | 0 | 0 | OCT 1 |
| PMT= SWITCH | | | 1 | 1 | 1 | 1 | R | OCT 2 |

FIG. 50

| INDEX | DC VALUES |
|-------|-----------|
| 1111 | PFT RELEASE (C-DRX) |

FIG. 51

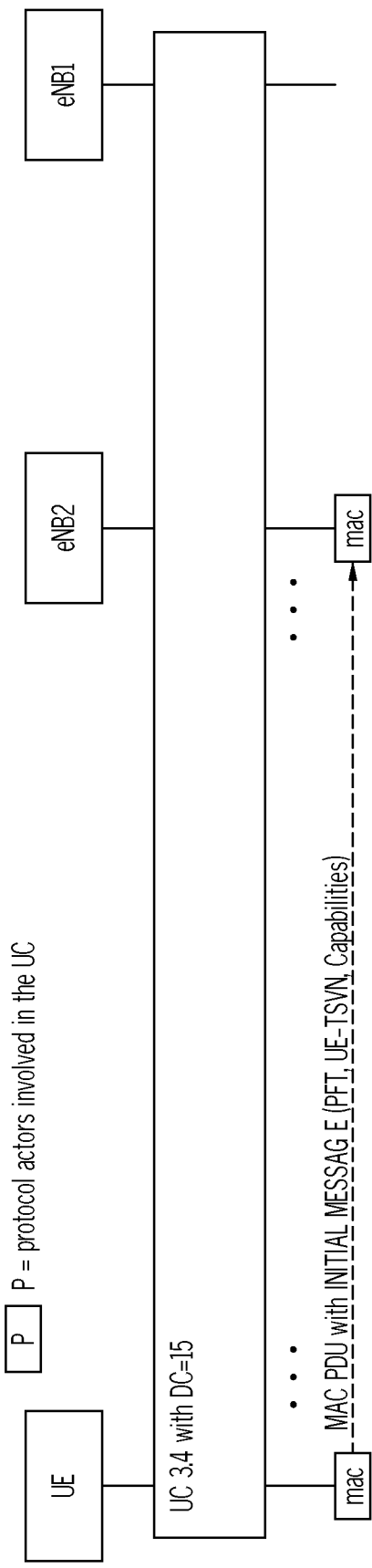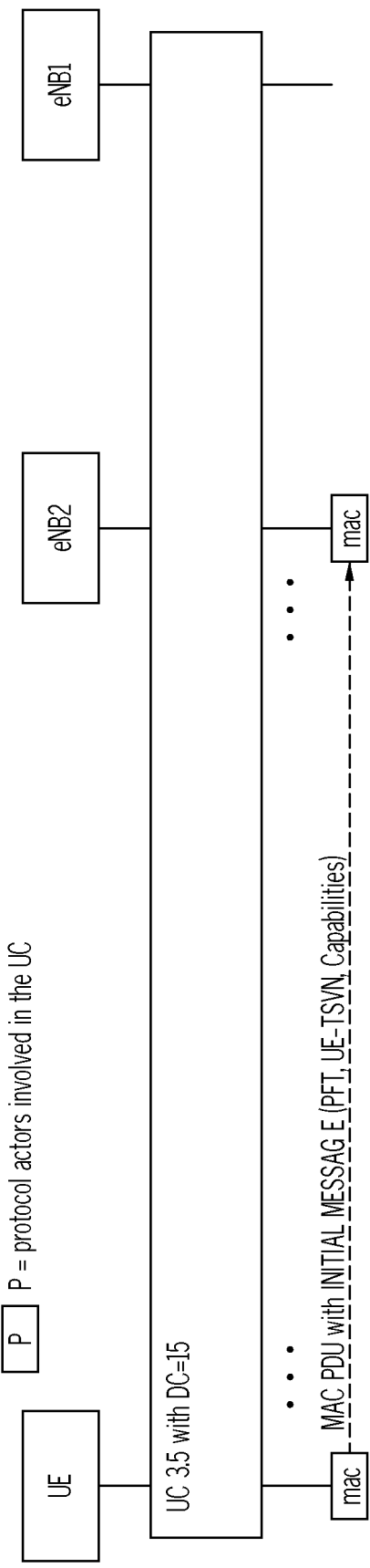

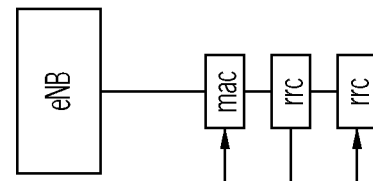
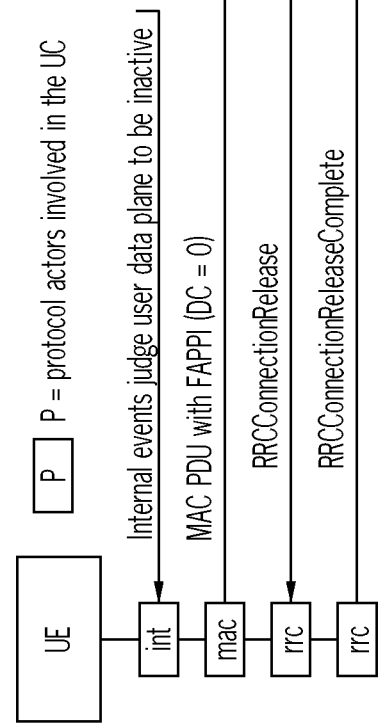
FIG. 59
FIG. 60
FIG. 61

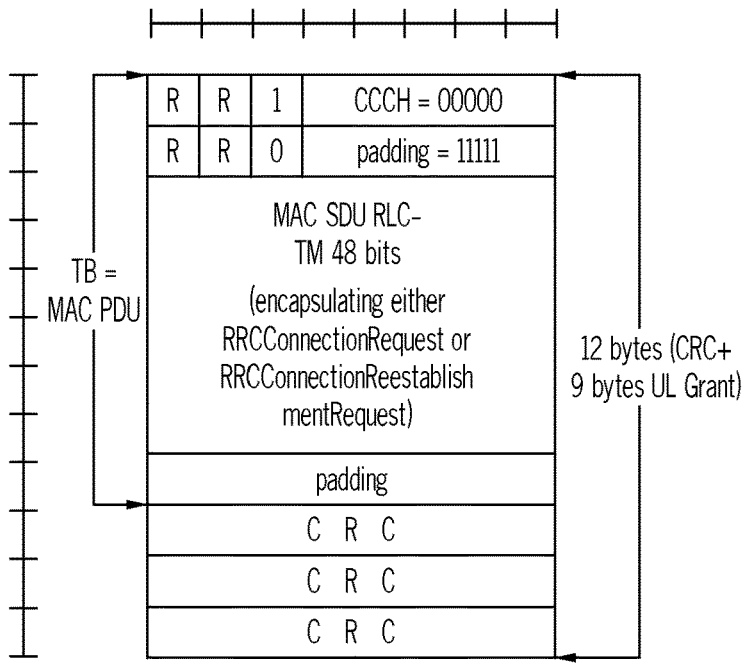
FIG. 63
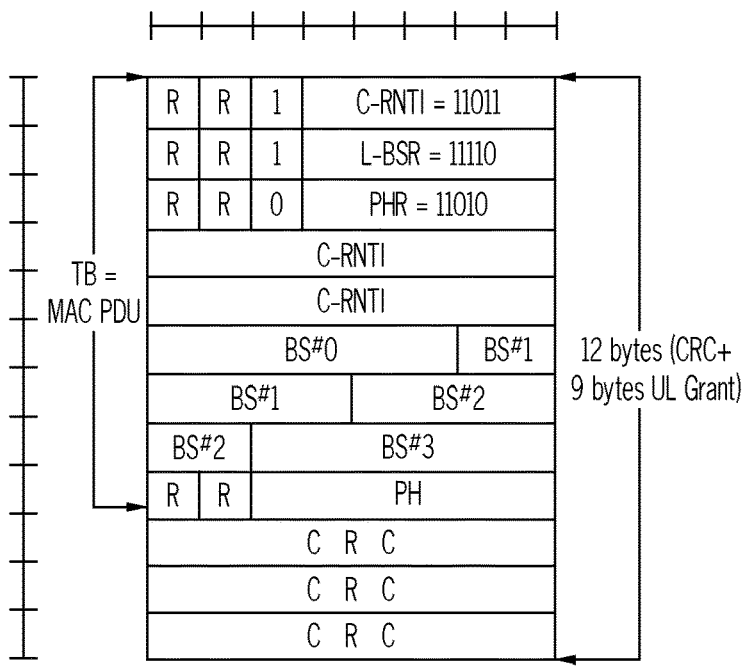
FIG. 64
| Index | LCID values |
|---|---|
| 11101 | Timing Advance Command |
| 11110 | DRX Command |
FIG. 65

RECEIVING, AN ANNOUNCEMENT MESSAGE INDICATING A NETWORK TYPE OF SOFTWARE VERSION NUMBER, N-TSVN SUPPORTING THE PFT ⟵7010

FIG. 70

TRANSMITTING, A FIRST APPLICATION INFORMATION, FAPPI, MESSAGE COMPRISING THE PFT, A NEXT FIELD THAT INDICATES THE FAPPI MESSAGE, AND AN UPLINK PMT FIELD INDICATING A FAPPI MESSAGE TYPE ⟵7110

FIG. 71

RCC CONNECTION ESTABLISHED ⟵7200

DETERMINING THAT A RRC CONNECTION IS OPERATING IN CDRX MODE ⟵7210

TRANSMITTING, AN ANNOUNCEMENT MESSAGE INDICATING A NETWORK TYPE AND SOFTWARE VERSION NUMBER, N-TSVN AND INDICATING SUPPORT FOR A PROTOCOL FEATURE TYPE, PFT ⟵7220

RECEIVING, IN RESPONSE TO THE ANNOUNCEMENT MESSAGE, AN INITIAL MESSAGE INDICATING SUPPORT FOR A PROTOCOL FEATURE TYPE, PFT, AND INDICATING A USER EQUIPMENT TYPE AND SOFTWARE VERSION NUMBER, UE-TSVN ⟵7230

TRANSMITTING, IN RESPONSE TO THE INITIAL MESSAGE, A HANDSHAKE MESSAGE COMPRISING THE PFT, A DOWNLINK PMT, INDICATING A TATDEF AND A PMB, ASSOCIATED WITH THE TATDEF MESSAGE TYPE THAT COMPRISES ONE OR MORE VALUES FOR REDEFINING A TIME ALIGNMENT TIMER ⟵7240

FIG. 72

TRANSMITTING A TAC TO TRIGGER APPLYING THE ONE OR MORE VALUES FOR REDEFINING THE TIME ALIGNMENT TIMER ⟵7310

FIG. 73

RECEIVING A F APPI, MESSAGE COMPRISING THE PFT, A NEXT FIELD THAT INDICATES THE FAPPI MESSAGE, AND AN UPLINK PMT FIELD INDICATING A FAPPI MESSAGE TYPE ⟵7410

METHOD FOR REDEFINING A TIME ALIGNMENT TIMER OF A WIRELESS COMMUNICATION NETWORK, CORRESPONDING USER EQUIPMENT AND NETWORK NODE

PRIORITY

This nonprovisional application is a U.S. National Stage Filing under 35 U.S.C. § 371 of International Patent Application Serial No. PCT/SE2016/050976 filed Oct. 10, 2016, and entitled "Method For Redefining a Time Alignment Timer of a Wireless Communication Network, Corresponding User Equipment and Network Node" which claims priority to U.S. Provisional Patent Application No. 62/260,934 filed Nov. 30, 2015, both of which are hereby incorporated by reference in their entirety.

TECHNICAL FIELD

The present disclosure relates to methods and operations by network nodes and user equipments in a wireless communication system.

BACKGROUND

Efficient resource scheduling for wireless radio frequency communications is important in telecommunications systems. In legacy systems, a user equipment (UE) does not have a way to inform a network node of the UE's current application requirements, and in some circumstances it is not possible for the UE to postpone non-critical application related network activities to a future more suitable time. Furthermore, the network node in a mobile network does not have a way to allow its current options to be known to the applications. In some circumstances, it is not possible for the mobile network to schedule non-critical application related network activities to a future more suitable time.

Policies used by most network operators are indifferent to application requirements and handle internet data merged onto the default bearer with the same scheduling and radio bearer realizations. Operators do not have visibility of what applications require and how applications perform with these policies.

Policies used by application providers are indifferent to radio capability requirements and handle transactions with the same end-to-end transport control. Application providers do not have the visibility of what is the mobile network capability and how the mobile network perform.

Currently, 3GPP standards are unaware of the UE's current application requirements. Therefore, current 3GPP standards may have inefficient resource scheduling resulting in higher UE battery utilization.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments disclosed herein are directed to a method performed by a UE of a wireless communications system. The method includes determining that a Radio Resource Control, RRC, connection from the UE to a network node is operating in Connected Discontinuous Reception, CDRX, mode. The method includes transmitting, to the network node, in response to the determining that the RRC connection is operating in CDRX mode, an initial message comprising a Protocol Feature Type, PFT, and a User Equipment Type and Software Version Number, UE-TSVN. The method includes receiving, from the network node, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a time alignment timer.

A potential advantage provided by these embodiments is allowing a UE and a network node to coordinate to perform application aware resource scheduling. The methods may allow for efficient resource scheduling such that the UE may reduce battery usage. Specifically, redefining a time alignment timer of a wireless communication network as described herein allows the UE and the network node to perform application aware resource scheduling by determining that a Radio Resource Control, RRC, connection from the UE to a network node (7600) is operating in Connected Discontinuous Reception, CDRX, mode, transmitting to the network node, in response to the determining that the RRC connection is operating in CDRX mode, an initial message comprising a Protocol Feature Type, PFT, and a User Equipment Type and Software Version Number, UE-TSVN, and receiving, from the network node, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that includes one or more values for redefining a time alignment timer.

In some further embodiments, the method may include applying the one or more values for redefining the time alignment timer in response to receiving a Time Alignment Command, TAC, from the network node. In some embodiments, determining that the RRC connection from the UE to the network node is operating in CDRX mode may include receiving, from the network node, an RRC Connection Reconfiguration message comprising an indication of the CDRX mode, and determining, based on the indication of the CDRX mode in the RRC Connection Reconfiguration message, that the network node is operating in CDRX mode. The method may include receiving, from the network node, an announcement message indicating support for the PFT and indicating a Network Type and Software Version Number, N-TSVN.

In some embodiments, the method may include transmitting, from the UE to the network node, a First Application Information, FAPPI, message comprising the PFT, a Next field that indicates the FAPPI message, and an uplink PMT field indicating a FAPPI message type.

Some other embodiments are directed to a user equipment, UE, operating in a wireless communication network. The UE includes a determining module, a transmitting module, and a receiving module. The determining module is configured to determine that a Radio Resource Control, RRC connection from the UE to a network node is operating in Connected Discontinuous Reception, CDRX, mode. The transmitting module is configured to transmit, to the network node, in response to the determining that the RRC connection is operating in CDRX mode, an initial message comprising a Protocol Feature Type, PFT, and a User Equipment Type of Software Version Number, UE-TSVN. The receiving module is configured to receive, from the network node, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a time alignment timer.

Some other embodiments are directed to a user equipment, UE, operating in a wireless communication network. The UE includes a transceiver configured to provide radio communications with a network node of the wireless communication network, a memory configured to store computer executable instructions, and a processor coupled to the memory and to the transceiver. The processor is configured to execute the computer executable instructions to perform operations including determining that a Radio Resource Control, RRC connection from the UE to a network node is operating in Connected Discontinuous Reception, CDRX, mode, transmitting, to the network node, in response to the determining that the RRC connection is operating in CDRX mode, an initial message comprising a Protocol Feature Type, PFT, and a User Equipment Type and Software Version Number, UE-TSVN, and receiving, from the network node, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a time alignment timer.

Some other embodiments are directed to a method by a network node serving a user equipment, UE, in a wireless communication network. The method includes determining that a Radio Resource Control, RRC, connection from the network node to a UE is operating in Connected Discontinuous Reception, CDRX, mode, transmitting, to the UE, in response to the determining that the RRC connection is operating in CDRX mode, an announcement message indicating a Network Type and Software Version Number, N-TSVN and indicating support for a Protocol Feature Type, PFT, receiving, from the UE, in response to the announcement message, an initial message indicating support for a Protocol Feature Type, PFT, and indicating a User Equipment Type and Software Version Number, UE-TSVN, and transmitting, to the UE, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a Time Alignment Timer.

In some embodiments, the method by the network node may include transmitting, to the UE, a Time Alignment Command, TAC, to trigger applying the one or more values for redefining the Time Alignment Timer by the UE. The method may include receiving, from the UE, a First Application Information, FAPPI, message including the PFT, a Next field that indicates the FAPPI message, and an uplink PMT field indicating a FAPPI message type.

Some other embodiments are directed to a network node serving a user equipment, UE, in a wireless communication network. The network node includes a determining module, an announcement transmitting module, a receiving module, and a handshake transmitting module. The determining module is configured to determine that a Radio Resource Control, RRC, connection from the network node to a UE is operating in Connected Discontinuous Reception, CDRX, mode. The announcement transmitting module is configured to transmit, to the UE, in response to the determining that the RRC connection is operating in CDRX mode, an announcement message indicating a Network Type and Software Version Number, N-TSVN and indicating support for a Protocol Feature Type, PFT. The receiving module is configured to receive, from the UE, in response to the announcement message, an initial message indicating support for a Protocol Feature Type, PFT, and indicating a User Equipment Type and Software Version Number, UE-TSVN. The handshake transmitting module is configured to transmit, to the UE, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a Time Alignment Timer.

Some other embodiments are directed to a network node serving a user equipment, UE, in a wireless communication network. The network node includes a transceiver configured to provide radio communications with the UE of the wireless communication network, a memory configured to store computer executable instructions, and a processor coupled to the memory and the transceiver. The processor is configured to execute the computer executable instructions to perform operations including determining that a Radio Resource Control, RRC, connection from the network node to a UE is operating in Connected Discontinuous Reception, CDRX, mode, transmitting, to the UE, in response to the determining that the RRC connection is operating in CDRX mode, an announcement message indicating a Network Type and Software Version Number, N-TSVN and indicating support of a Protocol Feature Type, PFT, receiving, from the UE, in response to the announcement message, an initial message comprising a Protocol Feature Type, PFT, and a User Equipment Type and Software Version Number, UE-TSVN, and transmitting, to the UE, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that includes one or more values for redefining a Time Alignment Timer.

Other methods by UEs, UEs, methods by network nodes, and network nodes according to embodiments will be or become apparent to one with skill in the art upon review of the following drawings and detailed description. It is intended that all such additional methods, resource management computer nodes, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIG. 1 illustrates a format for MAC extension.
FIG. 2 illustrates a MAC extension subheader.
FIG. 3 and illustrates the format of an initial message sent by the UE.
FIG. 4 illustrates a table including the mapping of various values of the PFT field and feature type.
FIG. 5 illustrates a handshake message sent by the network node to the UE.

FIG. 6 illustrates a table including the mapping of various values of the PMT field and message type.

FIG. 7 illustrates the format of a FAPPI message.

FIG. 8 illustrates a table including the mapping of various values of the PMT field to the message type for uplink scheduling.

FIG. 9 illustrates the format of an FAPPI message.

FIG. 10 illustrates the table including the mapping of an index value to the PFT Prohibit timer.

FIG. 11 illustrates the format of a switch message sent by the network node.

FIG. 12 illustrates a table including the mapping of the PMT values to the message type.

FIG. 13 illustrates an example format of a switch message.

FIG. 14 illustrates the format of an INS-CONFIG message.

FIG. 15 illustrates a table including mapping of PMT values to the message type.

FIG. 16 illustrates the format of an INS-CONFIG message.

FIG. 17 illustrates the PMB for a Time Alignment Timer Definition (TATDEF).

FIG. 18 illustrates tables with mappings for the single TAT and the double TAT.

FIG. 21 illustrates a table including the DC field in the FAPPI on the uplink.

FIG. 24 illustrates a table including the DC field for SWITCH mode on the downlink.

FIG. 25 illustrates a table including the PC field for SWITCH mode on the downlink.

FIG. 26 illustrates the 3GPP TS 36.321 behavior of the onDurationTimer.

FIGS. 48 and 50 illustrate message format for PFT release.

FIGS. 49 and 51 illustrate the mapping of the DC field in various messages.

FIGS. 52 to 54 illustrate message flows between the network node and the UE for PFT release.

FIG. 55 illustrates a message format for SWITCH mode that releases the PFT.

FIG. 56 illustrates the DC field for PFT release.

FIG. 59 illustrates the message format for an early release connection.

FIG. 60 illustrates the DC field in FAPPI on the uplink.

FIGS. 61 and 62 illustrate message flows between the network node in the UE for early connection release.

FIGS. 63 and 64 illustrate the message format depending on the grant.

FIG. 65 illustrates values of the LCID for the downlink.

FIGS. 67 to 71 illustrate a method in a UE and corresponding operations by a UE in accordance with some embodiments.

FIGS. 72 to 74 illustrate a method in a network node and corresponding operations by a network node in accordance with some embodiments.

DETAILED DESCRIPTION

Figure 19:
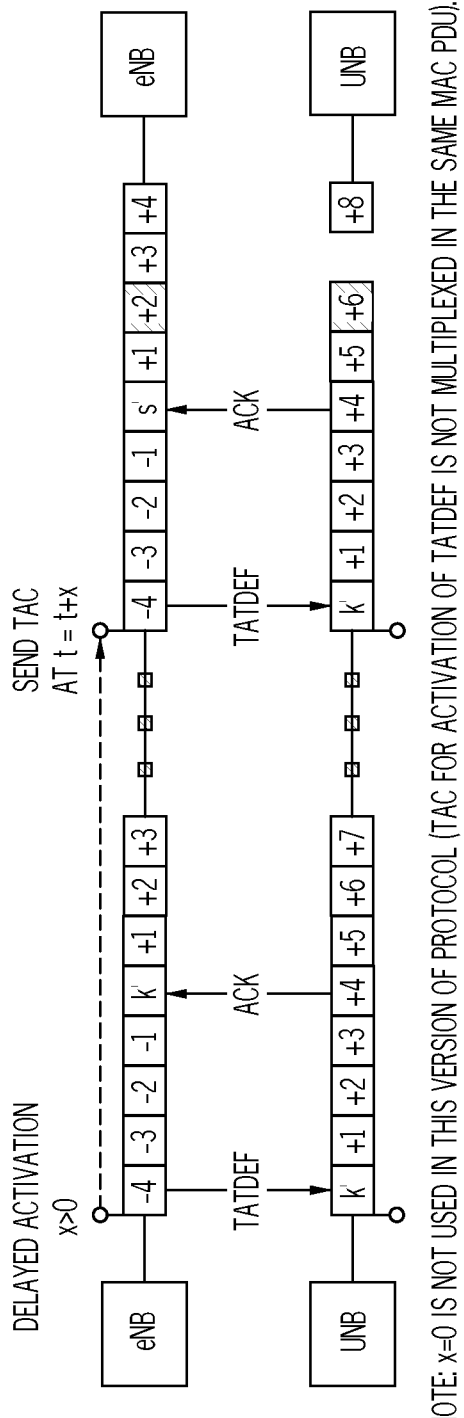
FIG. 19 illustrates delayed activation of the values of the content of the TATDEF.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Some embodiments of the present disclosure are directed to methods in a UE and related methods in a network node. Various embodiments of the present disclosure are directed to a framework specification for protocol operations for radio resource management for device types and applications that have a large variation of requirements. An operational structure for the UE and the network are provided to establish customized operations outside the strict definition of the associated 3GPP standard. The present inventive concepts provide extended functions on top of those that are standardized, in a way that may be compatible with the present and future standards eco-system.

Operations described herein may provide a differentiated application aware treatment of connections and traffic with regards to the instantaneous latency and throughput demands from applications running on top of the client. Moreover, the operations described herein may provide a differentiated mobile network resource aware treatment and observability of the traffic with regards to the instantaneous resource offerings from the mobile network.

In some embodiments a non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc Also in some embodiments generic terminology, "radio network node" or simply "network node" or "NW node", is used and can be any kind of node which may comprise of base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., TCE, MME, MDT node, MBMS node), or even an external node (e.g., 3rd party node, a node external to the current network), etc.

A non-exhaustive list of operations that may be performed by a network node and/or by a UE, according to various embodiments described herein follows:

LCID repurposing—an alternate use of the LCID variable space that is reserved for EPS bearer mapping (LCID 3-10), meaning that one or more free LCIDs in the upper part of that range is used to distinguish channels that sends messages that belongs to the extension;

Announcement Message—discovery of protocol support by the network; network sends the network type identifying the type/brand of network OEM (creator of software).

Announcement Message—discovery of protocol support by the network; network sends the LCID to use by UE to initiate establishment of protocol.

Announcement Message—discovery of protocol support by the network; network sends the feature types that UE can ask to use when initiating establishment of protocol.

Announcement Message—discovery of protocol support by the network; network sends the software versions supported by the network.

Initial Message—initiating protocol establishment; UE sends its type identifying type/brand of device OEM (creator of software).

Initial Message—initiating protocol establishment; UE sends its software version that it supports.

Initial Message—initiating protocol establishment; UE asks to use one feature type.

Initial Message—initiating protocol establishment; UE sends its feature type capabilities.

Handshake—Message finalizing protocol establishment; the network echoes the feature type;

Handshake—Message finalizing protocol establishment; the network sends options for the feature wherein options is a subset of the capabilities;

Handshake Message—finalizing protocol establishment; the networks sends an index to a table which defines which Time Alignment Timer to use:

FAPPI message—request EARLY DIAT EXPIRY—request an immediate expiry of the DRX inactivity timer;

FAPPI message—request EARLY TAT EXPIRY—request an immediate expiry of the Time Alignment Timer;

FAPPI message—request EARLY CIAT EXPIRY—request an immediate expiry of the Connection Inactivity Timer (release of the connection);

FAPPI message—request synchronous change to a preconfigured DRX configuration (synchronous to the next start of DRX on-duration phase);

FAPPI message—request release of the extended protocol with a synchronous change to a legacy configuration (synchronous to the next start of DRX on-duration phase);

FAPPI message—request suspension of the extended protocol with a synchronous change to a legacy configuration (synchronous to the next start of DRX on-duration phase);

SWITCH message—send EARLY TAT EXPIRY—a command to immediately expire the Time Alignment Timer;

Unacknowledged Release send RRC connection release with no response when the Time Alignment Timer is not running a command to release the connection without sending acknowledge back to the network;

SWITCH message—send command to synchronously change to a preconfigured DRX configuration (synchronous to the next start of DRX on-duration phase);

SWITCH message—send command to release of the extended protocol with a synchronous change to a legacy configuration (synchronous to the next start of DRX on-duration phase);

SWITCH message—send command to suspend the extended protocol with a synchronous change to a legacy configuration (synchronous to the next start of DRX on-duration phase);

INS-CONFIG message—send dedicated resource for scheduling request aligned to message sending contention resolution to the UE.

Embodiments related to application aware scheduling through agreements between the UE and the network will now be described in detail. Legacy networks may not allow the UE to have a way to let the current application requirements be known to the network. It may not be possible for the UE to postpone non-critical application related network activities to a future more suitable time. Policies used by most network operators may be indifferent to application requirements and may handle all internet data merged onto the default bearer with the same scheduling and radio bearer realizations. The Background traffic may cause many long RRC Connections while each RRC Connection is utilized for sending small amounts of data. Embodiments described herein may provide a mutually agreeable solution for the network node and the UE such that gains may be realized and validated at both ends of the network in terms of reduced power and resource usage.

Figure 36:
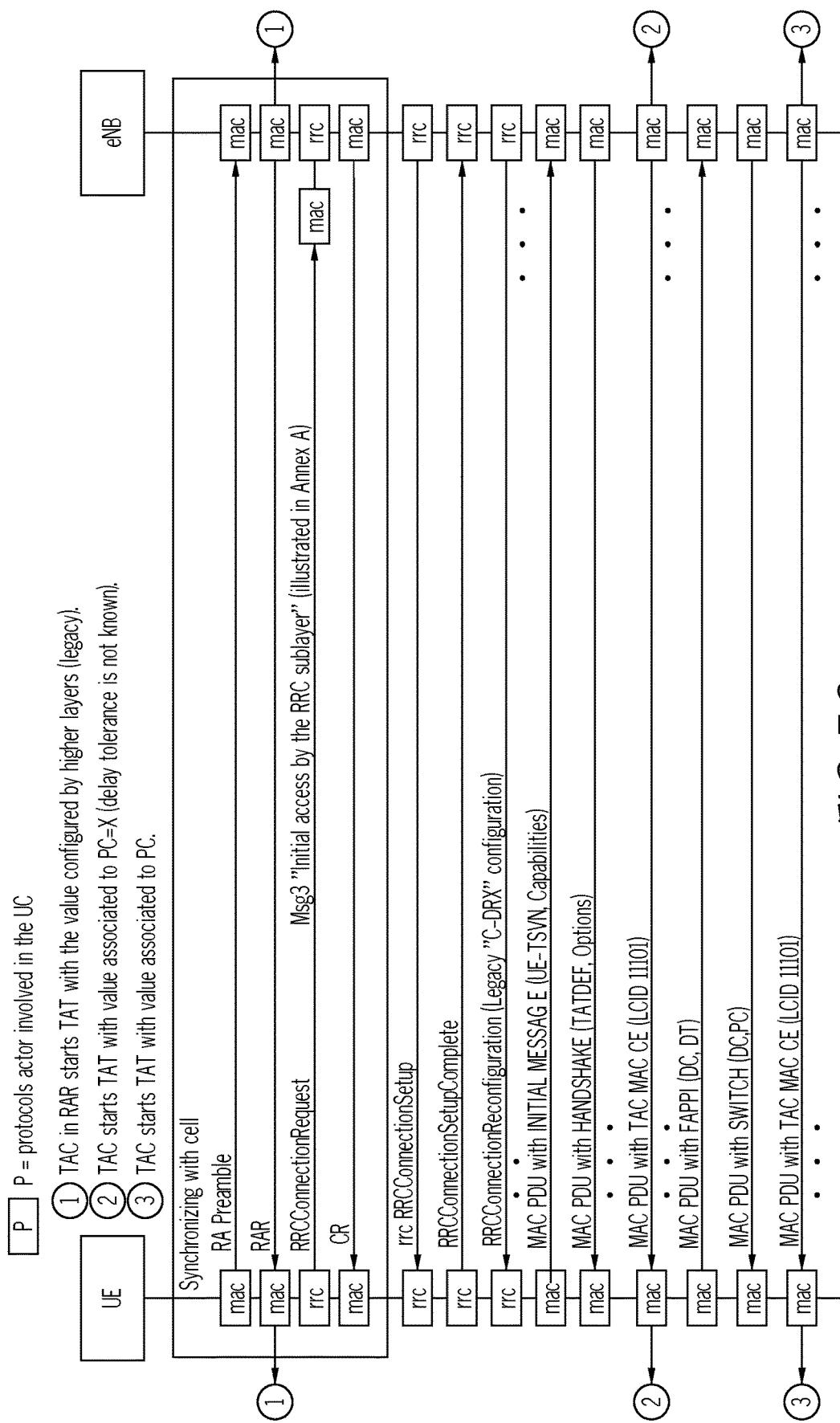
FIG. 36 illustrates message flows between the network node and the UE for PFT establishment.

Protocol Feature Type (PFT) establishment for the solution described herein for redefining a time alignment timer (TAT) may be initiated by the UE, according to some embodiments, as illustrated by the message flow diagram of FIG. 36. The operations for redefining the time alignment timer to improve resource usage and reduce power consumption by the UE will now be discussed in further detail.

Extended MAC

A Logical Channel Prioritization procedure may improve resource usage and reduce power usage when a new transmission is performed. The UE and the network exchange messages using extensions over MAC. The format of the MAC extension elements (MAC EE), illustrated in FIG. 1, aligns to that of a MAC Control Element (MAC CE). The Logical Channel Identity (LCID) may be set using an extended MAC. The MAC EE message may be identified by a MAC PDU sub-header containing a LCID in the most-upper part of the standardized Dedicated Traffic Channel (DTCH). The sub-header for the MAC EE may include an LCID that is set by the extraordinary Logical Channel Identity (XLCID) in the Announcement Message. The MAC EE message format of FIG. 1 may include a second byte in the message that is specified by the N field in the first byte. If N=0, the second byte contains the Type and Software Version Number (TSVN) of the Protocol Feature Type (PFT) peer. FIG. 1 illustrates the case of N=1, when the second byte includes the Protocol Message Type (PMT) and the Protocol Message Body (PMB). The MAC EE message may have a size≥2 with a variable length determined by the L-field of the sub-header of FIG. 1. The LCID in the most-upper part of the standardized Dedicated Traffic Channel (DTCH) of the MAC EE may be in the range 00011-01010 (i.e. decimal values 3 to 10).

The first occurrence of a MAC EE may be in the initial message shown in FIG. 36 sent by the UE to request establishment of a logical channel. The UE uses the LCID as defined by the XLCID entry in the Announcement Message, which may be part of the Network Type and Software Version Number (N-TSVN). The MAC EE may be of variable length but includes a first byte that identifies the Protocol Feature Type (PFT). The extension element may not be an SDU for a logical channel which has been configured by higher layers. It may not be a MAC control element but normal MAC rules may apply nevertheless. The MAC entity may assemble/multiplex and disassemble/demultiplex to and from a MAC PDU as defined by 3GPP TS 36.321. The MAC EE may be judged by the Logical Channel Prioritization procedure when a new transmission is performed. For this purpose, it may inherit the priority and logicalChannelGroup of the DTCH for which the PFT is agreed to be used. In other words, the DTCH which is associated to the default bearer of the Internet APN in this version of protocol may be used. Other logical channel parameters such as prioritisedBitRate, bucketSizeDuration, logicalChannelSR-Prohibit-r12, logicalChannelSR-Mask-r9, may not apply to the MAC extensions.

MAC Extension Subheader for DL-SCH and/or UL-SCH

FIG. 2 illustrates MAC extension subheader for a Downlink Shared Channel (DL-SCH) and/or an Uplink Shared Channel (UL-SCH). A MAC PDU header may include zero or one MAC EE subheader. A MAC EE subheader can include six header fields R/R/E/LCID/F/L, unless it is the last subheader in the MAC PDU. The MAC EE subheader without F/L-fields may include four header fields R/R/E/LCID.

The subheader for a MAC EE may include several fields, according to some embodiments, is illustrated in FIG. 2. Referring now to FIG. 2, the subheader may include R, which is a Reserved bit, set to "0" or as specified in the mutually supported 36.321. Subheader field E is an extension field specified in 36.321, and may be a flag indicating if more subheaders are present in the header of the MAC PDU. This may be a different extension than the MAC EE previously described. The subheader field LCID may be included by the UE in the initial message to indicate the Logical Channel ID (LCID). The LCID value of a MAC EE may be set by XLCID in the N-TSVN variable. The messages that follow over the MAC extension may echo the same LCID. Subheader field L is a length field that indicates the length of a corresponding variable-sized MAC EE message in bytes. It is not used for the last subheader. The size of the L field may be 7 bits or 15 bits. Subheader field F is the Format field and indicates the size of the length field. The size of the F field is 1 bit and may be always set to 0 in a version of the protocol where variable-sized MAC EE messages larger than 128 bytes are not supported.

Figure 67:
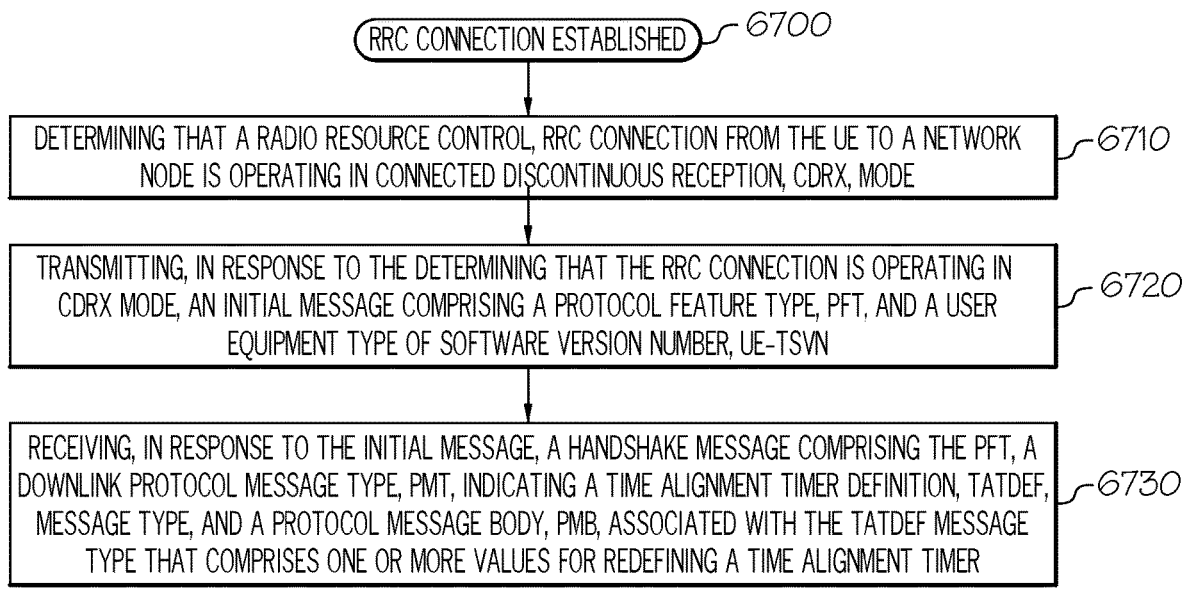

FIGS. 67 to 71 are flowcharts of methods in a UE and corresponding operations by a UE, according to some embodiments described herein. FIGS. 72 to 74 are flowcharts of methods in a network node and corresponding operations by a network node, according to some embodiments described herein. Potential advantages provided by these embodiments include allowing a UE and a network node to coordinate to perform application aware resource scheduling allowing for efficient resource scheduling such that the UE may reduce battery usage. Specifically, redefining a time alignment timer of a wireless communication network as described herein allows the UE and the network node to perform application aware resource scheduling. Referring now to FIG. 67, an RRC Connection may be established between a network node and a UE, at block 6700 of FIG. 67. Similarly, referring now to FIG. 72, an RRC Connection may be established between a network node and a UE, at block 7200 of FIG. 72. The network node may determine that an RRC connection is operating in Connected Discontinuous Reception (CDRX) mode, at block 7210 of FIG. 72. At block 7220 of FIG. 72, the network node may transmit, to the UE, in response to determining that the RRC connection is operating in CDRX mode, an announcement message indicating a Network Type and Software Version Number (N-TSVN) and indicating support for a Protocol Feature Type (PFT).

The announcement message may be part of the RRCConnectionReconfiguration message of FIG. 36, which is sent from the network node to the UE. The announcement message may be transmitted as part of an initial RRCConnectionReconfiguration message and/or be piggybacked on the initial RRCConnectionReconfiguration message. In other words, the announcement message may be sent in the first rrcConnectionReconfiguration message, after the RRC connections establishment. The announcement message may be sent in a point-to-multipoint message similar to system information messages broadcasted in legacy LTE systems. The announcement message may not occur later than the actual configuration of C-DRX which is configured in the first RRCConnectionReconfiguration message.

In some embodiments, since some basic measurements and DRX must be configured after establishing RRC connection in a cell for initial access or handover, the announcement message may be coded in the first RRCConnectionReconfiguration message and not in any subsequent RRCConnectionReconfiguration messages. One TATDEF may be allowed per connection or per cell. If the UE changes cells, it may be allowed to again start the PFT by sending again another initial message to the network node. The network node may not send TATDEF unless contained in a handshake message, which in turn will be sent if it receives the initial message from the UE. The purpose of the RRC connection reconfiguration procedure may be to modify an RRC connection. For example, the purpose may be to establish, modify, and/or release RBs, to perform handover, to setup, modify, and/or release measurements and/or to setup, modify, and/or release C-DRX as described in 3GPP TS 36.331. The announcement message is not be a part of the legacy RRC connection reconfiguration procedure as published as in 3GPP TS 36.331. As described herein, a part of the RRCConnectionReconfiguration that configures a measurement in the UE is used to "piggyback" the announcement message to provide an indication that the network node announces support for the agreed extension of the protocol.

Still referring to FIG. 36, the announcement message is sent by the network node. It may specify the software versions that are supported by including a Network Type and Software Version Number (N-TSVN). The announcement message may also specify the network type and the LCID for the PFT interaction. The announcement message is sent to ensure that the UE supports a software version needed for operation of the network node to monitor the extension of MAC for the possible arrival of an initial message from the UE in FIG. 36. A MAC PDU may be a container for all control messages sent by RRC. The MAC PDU may also be a container for control messages that originate and terminate in the MAC itself, and are known as "MAC Control Elements" or in "MAC CE". In a similar way, there may be intermediate layers above the MAC layer and below the RRC called PDCP and RLC. These may be local control messages such as RLC Control PDUs and/or PDCP control PDUs. These control messages may be encapsulated in a MAC PDU container before being passed onwards to the physical layer.

Referring to FIG. 67, the UE may determine that a Radio Resource Control (RRC) connection from the UE to a network node is operating in Connected Discontinuous Reception (CDRX) mode, at block 6710. At block 6720 of FIG. 67, the UE transmits, to the network node, in response to determining that the RRC connection is operating in CDRX mode, an initial message comprising a Protocol Feature Type (PFT) and a User Equipment Type and Software Version Number (UE-TSVN). The initial message from the UE requests an establishment of a logical channel for a specified PFT. The combination of values used for N-TSVN and UE Type and Software Version Number (UE-TSVN) supports version control with regards to the type and software versions used in the UE and network.

FIG. 3 illustrates the format of the initial message of FIG. 36 and described in FIG. 67. The initial message is sent by the UE. It specifies the Protocol Feature Type (PFT). In some embodiments, the UE may not send more than one Initial Message per PFT, cell and/or connection. The initial message may include several fields, according to some embodiments. The initial message may include N, the Next field, which is one bit. The N field for the initial message may be set to 0, which implies that the format of the second byte is UE-TSVN and is not PMT and/or PMB. The Protocol Feature Type (PFT) field may be 7 bits in length. In the initial message, the UE may specify values of PFT as shown in the table of FIG. 4. Packets including some values of the PFT may be discarded by the network node, except, for example in FIG. 4, the value of PFT=0001000, which indicates Appache DRX switching. The messages that follow over the MAC extension may echo the same PFT value used in the initial message. The initial message may include the UE-TSVN, as specified by the UE. The initial message may also include capabilities specified by the UE for the PFT. PFT may be used to distinguish feature type versions, but its primary purpose is to distinguish different feature types. The UE-TSVN field in the initial message may indicate the type and software version number on the UE side. The N-TSVN, as coded by the announcement message, indicates the type and software version number on the network side. The UE may not send the initial message until it has a valid reception of the announcement message, according to some embodiments. The PFT and UE-TSVN may be supported by the network.

Referring to FIG. 72, the network node will receive, from the UE, in response to the announcement message, the initial message indicating support for a Protocol Feature Type (PFT) and indicating a User Equipment Type and Software Version Number (UE-TSVN), at block 7230. The network node will respond to the initial message with the handshake message, as illustrated in the signal flow diagram of FIG. 36. Still referring to FIG. 72, the network node will transmit, to the UE, in response to the initial message, a handshake message comprising the PFT, a downlink Protocol Message Type (PMT) indicating a Time Alignment Timer Definition (TATDEF) message type, and a Protocol Message Body (PMB), associated with the TATDEF message type that includes one or more values for redefining a Time Alignment Timer, at block 7240 of FIG. 72. The handshake message is sent by the network as a response to the initial message, according to some embodiments. The handshake message echoes the PFT used in of the initial message and appends options as well as a first control message for the specified PFT.

FIG. 5 illustrates the format of the handshake message. The PMT field may be set to a value of 000 in the handshake message. The handshake message includes several fields shown in FIG. 5, according to some embodiments. The handshake message may include N, the Next field that is represented by one bit. As in the example of FIG. 5, the N field in the handshake message may be set to 0 to indicate that the format of the second byte is optional and not to be construed as PMT and/or PMB. The PFT field represents the Protocol Feature Type field and may be 7 bits in length. The PFT may be set to the value used in the first byte of the initial message, according to some embodiments. The options field will be set by the network node to specify the options for the PFT. The PMT field represents the Protocol Message Type field and may be 3 bits in length. The PMT in the handshake message may set to 000, for example, as illustrated in the table of FIG. 6 for the PMTs on DL-SCH supported in an example version of the protocol. The PMB field represents the Protocol Message Body for Time Alignment Timer Definition (TATDEF) on DL-SCH. As shown in FIG. 6, PMT=000 may indicate that the message type is TATDEF. The TATDEF is a command that redefines the Time Alignment Timer as configured by higher layers. The TATDEF may not be mistaken as another variant of the Timing Advance Command that is specified by TS 36.321.

Referring to FIG. 67, the UE may receive, from the network node, in response to the initial message sent by the UE, the handshake message including the PFT, a downlink Protocol Message Type (PMT) indicating a Time Alignment Timer Definition (TATDEF) message type, and a Protocol Message Body (PMB) associated with the TATDEF message type that includes one or more values for redefining a time alignment timer, at block 6730. The network node may not send the handshake message until it has a valid reception of the initial message from the UE, according to some embodiments. The network node uses the LCID in the handshake message with exclusivity for the PFT purpose and refrains from any concurrent reuse to identify logical channels mapped to EPS bearers, according to some embodiments. The TATDEF command may define a single TAT or a pair of TAT values that are used throughout the PFT. The TATDEF may be defined after a switch with delay tolerance, with DC=14, indicating that the PFT is suspended where the legacy C-DRX is used. The DC field may represent the DRX Configuration, which may also be referred to as Defined Configuration. Peer nodes may revert to the TAT defined by RRC when the PFT is released, no matter if explicitly by a DC=15 (PFT RELEASE), or implicitly by connection release or for reasons discussed later in Handling of Transactions with higher priority DTCHs.

Figure 68:

Referring now to FIG. 73, the network node may transmit, to the UE, a Time Alignment Command (TAC) to trigger applying the one or more values for redefining the Time Alignment Timer by the UE, at block 7310 of FIG. 73. Referring now to FIG. 68, the UE may apply the one or more values for redefining the time alignment timer in response to receiving a Time Alignment Command, TAC, from the network node, at block 6810.

Figure 69:
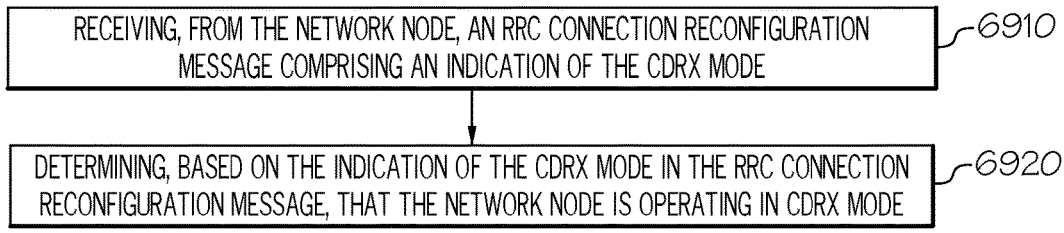

According to some embodiments, a determination is made by the UE that the RRC connection from the UE to the network node is operating in CDRX mode. Referring now to FIG. 69, the determining by the UE that the RRC connection is operating in CDRX mode may include receiving, from the network node, an RRC Connection Reconfiguration message comprising an indication of the CDRX mode, at block 6910 of FIG. 69. The UE may determine, based on the indication of the CDRX mode in the RRC Connection Reconfiguration message, that the network node is operating in CDRX mode, at block 6920 of FIG. 69. Referring now for FIG. 70, the UE may receive an announcement message from the network node, indicating a Network Type and Software Version Number (N-TSVN) supporting the PFT, at block 7010 of FIG. 70.

The FAPPI (First Application Information) message is sent by the UE to indicate relevant changes in the current application requirements in terms of delay tolerance and matched DRX configurations, according to some embodiments. The FAPPI message echoes the PFT used in the initial message and appends the first application information. The FAPPI message is sent as a result of relevant changes in application layer requirements and the internal analysis of that in the UE. This protocol may not include operations for the network to poll FAPPI from UE, according to some embodiments. Referring to FIG. 71, the UE may transmit, from the UE to the network node, a FAPPI, message including the PFT, a Next field that indicates the message to be a FAPPI message, and an uplink PMT field indicating a FAPPI message type, at block 7110 of FIG. 71. Referring to now to FIG. 74, the network node may receive, from the UE, a FAPPI message including the PFT, a Next field that indicates the message as a FAPPI message, and an uplink PMT field indicating a FAPPI message type, at block 7410 of FIG. 74.

The FAPPI message is sent by the UE to indicate relevant changes in the current application requirements in terms of delay tolerance and matched DRX configurations, which may be adapted to the requirement of delay tolerance of the present applications. Algorithms and/or processes running on the UE such as presence detection, face recognition, and/or display on/off may be able to conclude if and how a user is present or if the applications are just caused by automatic updates by applications such as Facebook, etc. For example, if a user is determined to be present and may have facial information, the applications are likely to transfer "eye-ball content" for which the delay tolerance may be lower such that the DRX configuration may be adapted to be less aggressive in terms of battery savings with larger on-duty-cycles. If the user with facial information is not present, a more aggressive DRX configuration may be used. The latter may be, for example, Facebook updates, or applications such as iTunes and Spotify, which use large play-out buffers for streaming music from a network server, may not require continuous access to the radio interface.

FIG. 7 illustrates the format of the FAPPI message. The FAPPI message may include several fields, according to some embodiments. The FAPPI message may include N, the Next field, which may be one bit in length. The N field in the FAPPI message may be set to 1 to indicate that the format of the second byte is PMT and/or PMB. The FAPPI message may include PFT, the Protocol Feature Type field of length 7 bits. The PFT may be set to the value used in the first byte of the initial message. The FAPPI message may include PMT, the Protocol Message Type field of length 3 bits. The PMT in the FAPPI message may be set to 001. FIG. 8 is a table of PMT values on UL-SCH supported in by an example version of this protocol. The FAPPI message may include PMB, the Protocol Message Body for FAPPI on UL-SCH.

FIG. 9 illustrates the format of the FAPPI message, according to some embodiments. The UE may not send or append the FAPPI message unless it uses DRX Configuration-In Synch (DC-INS). DC-INS is used to discriminate/denote the configuration to use while TAT (Time Alignment Timer) is running. DRX Configuration-Out of Synch (DC-OOS) is the configuration to use when the TAT has expired such that the UE is considered to be 'out-of-synchronization' on the shared UL channel, Physical Downlink Shared Channel (PDSCH), and as such may be forbidden to transmit on the UL channel. If that UE has something to send it may instead make a random access and resynchronize on the UL channel. The UE may send the FAPPI message after it has received a valid reception of the handshake message with a successful match between UE-TSVN and N-TSVN, according to some embodiments. The UE applies the PFT prohibit timer that has been preconfigured in each peer of the protocol. The UE starts the prohibit timer when its physical layer is instructed to generate a transmission of a FAPPI message. The UE may not send a new FAPPI message unless the prohibit timer for the PFT has expired or the new FAPPI is meant to indicate a desired change by either DC=13 (early DIAT expiry), DC=14 (PFT suspend) or DC=15 (PFT release). Since the network node may discard a FAPPI, for example, for reasons of high load or running already started procedures to completion, the UE may trigger a maximum of two such FAPPIs, unless the prohibit timer has expired.

FIG. 10 illustrates a table for the prohibit timer to use the FAPPI message, according to some embodiments. The timer may be hardwired and mutually understood ahead of time between the UE and the network node. As a consequence, explicit index configuration may not be needed or used in example version of protocol. The long DRX cycle (LDC) is the cycle length associated to the longDRX-CycleStartOffset that is specified with the prohibit timer. Neither the PFT prohibit timer nor DRX and LDC restrict the UE from triggering SR if it encounters a change from no longer being delay tolerant. The above may be a restriction for the reversed case for which it specifically disallows UE from a frequent use of FAPPI to trigger SR. The PFT prohibit timer is not used to prohibit data, although the UE should not trigger SR for a user data plane that is momentarily delay tolerant, according to some embodiments. The network uses duplicate discard on FAPPI to avoid switching to a configuration that is already achieved. Specifically, the network may use duplicate discard for the reception of a FAPPI requesting a dormant position, for example, a FAPPI with DC=13 (early DIAT expiry), DT=1 (early TAT expiry), or DC=0 (early CIAT expiry), and may not queue up actions on previously received copies.

A switch message may be sent by the network, according to some embodiments. The switch message echoes the PFT used in the initial message and appends the switch control information. FIG. 11 illustrates an example format of the switch message. The switch message may include several fields, according to some embodiments. N is the Next field and is represented by one bit. The N field in the switch message may be set to 1 to indicate that the format of the second byte is PMT and/or PMB. The PFT field indicates the Protocol Feature Type field may be a length of 7 bits. The PFT may be set to the value used in the first byte of the initial message received from the UE. The PMT field represents the Protocol Message Type field may be 3 bits in length. The PMT in the switch message may be set to a value of 001. The PMB field represents the Protocol Message Body of the switch message on DL-SCH. FIG. 12 includes a table for the PMTs on DL-SCH supported in an example version of the protocol.

FIG. 13 illustrates the format of the switch message. The network node may not send or append the switch message unless it has appended or has already sent the handshake message, according to some embodiments. The switch message is sent based on internal events in the network. These internal events are typically the direct and immediate consequence of receiving a FAPPI message from the UE. The network node may also send the switch message as a delayed consequence of receiving a FAPPI message or as a result of other internal events, such as overload or handover execution. The switch message may also be the result of relevant changes in the application requirements as it has been autonomously noted on the network side. The UE may use duplicate discard upon switching to avoid a switch to a configuration that is already achieved.

The In-Synch Configuration (INS-CONFIG) message is sent by the network node, according to some embodiments. The INS-CONFIG message echoes the PFT used in the initial message and appends a control message that provides a PUCCH resource for dedicated scheduling requests. FIG. 14 illustrates the format of the INS-CONFIG message and may include the following fields, according to some embodiments. The INS-CONFIG message includes N, which is the Next field and is represented by one bit. The N field in the INS-CONFIG message may be set to 1, for example, to indicate that the format of the second byte is PMT and/or PMB. The INS-CONFIG message includes the PFT field which is the Protocol Feature Type field that is 7 bits in length. The PFT may be set to the value used in the first byte of initial message. The INS-CONFIG message includes the PMT field which represents the Protocol Message Type and has a length of 3 bits. The PMT in the INS-CONFIG message may set to 010, for example, as illustrated in the table of FIG. 15 which includes PMT values on DL-SCH supported in an example version of protocol. The INS-CONFIG message includes the PMB field which represents the Protocol Message Body for INS-CONFIG on DL-SCH.

FIG. 16 illustrates the format of the INS-CONFIG message, according to some embodiments. The network may not send or append the INS-CONFIG message unless it has appended or already sent the handshake message, according to some embodiments. The INS-CONFIG message is sent based on internal events in the network. These events are typically the direct and immediate consequence of successful resynchronization with the UE. The network may also send the INS-CONFIG message as a delayed consequence of such an occurrence or as a result of other internal events. The UE may use duplicate discard on the configuration contained by INS-CONFIG to avoid a change to a configuration that is already achieved. The INS-CONFIG may be optional and depends on the PFT options provided by the network.

The SAPPI and TAPPI may be defined based on one or more of the embodiments herein. The feedback of application information from the UE to the network node operates according to one or more embodiments disclosed herein. Without feedback of application information from the UE, collaboration between the UE and the network node may rely on some shared values.

FIG. 17 illustrates the format of the PMB for TATDEF, according to some embodiments. The size of the PMB for TATDEF is 5 bits and may include several fields, according to some embodiments. The PMB may include an R bit Reserved that is set to 0 in the example version of the protocol. The TAT field includes TAT1 and TAT2 and may be a total of 4 bits. The table of FIG. 18 includes Time Alignment Timer (TAT) values supported in an example version of protocol. The use of the values in the rightmost table of FIG. 18 is optional and depends on the PFT options provided by the network node. The Double TAT configuration in FIG. 18 includes a first (Short-TAT) and second (Long-TAT) preconfigured values of TAT. The units are defined in terms subframes of 1 ms in LTE. Long-TAT is used when PC=0, and Short-TAT is used otherwise. PC=X: agnostic to delay tolerance (Single TAT) or default while delay tolerance is unknown (Double TAT). PC=1 may be signaled as confirmed delay tolerant. PC=0 may be signaled in the alternative case. Values configured by Non-PFT legacy (RRC) may be used.

The TATDEF may be configured by the handshake message, according to some embodiments. The UE and network node may not begin to use any contained values, but rather wait to activate until a next Timing Advance Command MAC control element. Delayed activation for x>0 based on the content of TATDEF is illustrated in FIG. 19. For such a Timing Advance Command MAC control element received by UE on subframe s≥k, the start/restart TAT with a value defined by TATDEF may occur at the beginning of subframe s+6. For the associated ACK received by the network node on subframe s', the start/restart shall occur at the beginning of subframe s'+2. The values associated to Double TAT are activated together although TAT is defined by one value at each moment. If PC=X or PC=1, TAT is defined by Short-TAT, otherwise Long-TAT.

Figure 20:
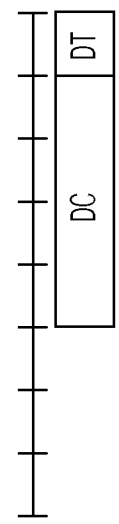
FIG. 20 illustrates the message body PMB for the FAPPI.

FIG. 20 illustrates the format of the PMB for FAPPI, according to some embodiments. The size of the PMB for FAPPI is 5 bits and may include a DC field that is 4 bits in length, for UL-SCH support, as shown in the table in FIG. 21. The DT field represents a flag that depends on the DC field and indicates the current delay tolerance. The DC-INS values may be used while the UE is time aligned in the uplink and/or when the Time Alignment Timer (TAT) is running. The DC-out of synch (DC-oos) values may be used when the TAT has expired and/or while the UE remains in CONNECTED. The values configured by Non-PFT, legacy RRC may be used. The ODT field configures the onDurationTimer (ODT≥psf2). The DIAT field configures the drxInactivityTimer. For example, DIAT for DC-INS≥psf10. DIAT for DC-oos=psf200. DIAT may not be restarted while remaining in out of synch (oos), but may be restarted at transition to INS, by PDCCH order or by the MAC sublayer itself. The DRT configures the drxRetransmissionTimer. The LDC field configures the cycle length associated to the longDRX-CycleStartOffset (LDC≥sf320). The SDC field indicates that shortDRX-Cycle is disabled. Peers acting as if the shortDRX RRC IE was excluded have drxShortCycleTimer=0. Some values of DC may be hardwired and mutually understood ahead of time between the UE and the network node.

The UE may use DC=0 (EARLY CIAT EXPIRY) to indicate a desire to release the connection, i.e. switch to IDLE mode and use the Idle Mode Discontinuous Reception (I-DRX) defined there. The UE may use this value when the UE has cause to judge that the user data plane is inactive in that it has neither data to upload nor does it have a request to download data. The UE may rather uses DT=1 (EARLY TAT EXPIRY) if data is expected but data is delay tolerant. The UE may use DC=15 (PFT RELEASE) to indicate a desire to release the PFT, which in the context of the table in FIG. 21, implies a desire to switch to legacy C-DRX. The UE may use DC=14 to indicate a desire to continue with the PFT but temporarily suspend it and instead have both the DC-INS and the DC-oos parts of the pair be defined by legacy C-DRX, according to some embodiments.

Figures 22, 23:
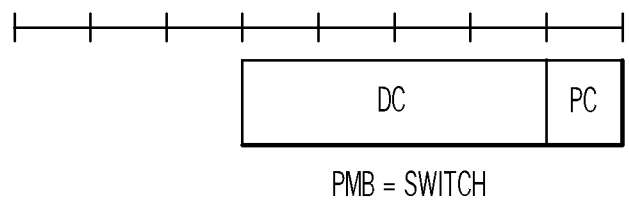
FIG. 22 illustrates a table including the DT field in the FAPPI on the uplink.
FIG. 23 illustrates the message body for the PMB for SWITCH on the downlink.

The table in FIG. 22 illustrates values of the DC-field in FAPPI on the UL-DCH. DC is an index to preconfigured data, as shown in the table in FIG. 22. For example, for DC values of 0, 13, and/or 15, the field may be Reserved. DC=0 may imply a desire to release the connection. DC=13 may indicate not to trigger a switch. DC=15 may mean a desire to end the PFT, thus to end the DT classification. DC values that are Reserved may not be used in some versions of protocol. Delay Tolerant may indicate 'Background—No hurry' or may indicate 'Foreground No Hurry'. A typical example of the 'Foreground No Hurry' may be when the application coalescing in the device is dominated by Dynamic Adaptive Streaming over HTTP (DASH) video with a full play-out buffer, where HTTP is Hypertext Transfer Protocol.

FIG. 23 illustrates the format for the PMB for switch, according to some embodiments. The size of the PMB for switch is 5 bits and may include DC field, which is 4 bits in length and PC field which is a flag that depends on the DC field. FIG. 24 illustrates a table for the DC values on DL-SCH supported in some versions of the protocol. The DC field may be an index to preconfigured data. Many values used for the DC filed in switch mode are the same as for FAPPI, as show in FIG. 21. The typical response to DC=13 in FAPPI (EARLY DIAT EXPIRY) is not switch mode but LCID=11110. Call flow related to this case will be discuss in the context of FIG. 46. DC=15 is used to indicate RELEASE of the PFT, which in the context of the table of FIG. 24 may imply a switch to legacy DRX, according to some embodiments. DC=14 is used by the network to indicate SUSPEND of the PFT and that both DC-INS and DC-oos are defined by legacy DRX although the PFT remains established, according to some embodiments.

The table of FIG. 25 illustrates values of the PC field in switch mode on the DL-DCH. The PC field may be a flag that indicates which of DC-INS or DC-oos shall be used, as shown in the table of FIG. 25. If DC-INS is used, the UE and network node shall continue as controlled by the TAT. If DC-OOS is used, the UE and the network may behave as if TAT expired (release PUCCH/SRS). For DC=0, 13, 15 the field may be reserved and may not be used in some versions of the protocol. When DC-INS values are used, the UE may not change its behavior with regards to TAT. When DC-oos values are used, the UE may behave as if the TAT had expired.

For PC=0 and PC=1, in response to being in switch mode, the UE and the network node may change to the indicated configuration at subframe n in the beginning of the first on-duration phase, as specified for DC-INS or DC-oos of the new DRX configuration, started after acknowledged reception of the MAC PDU including the switch message, according to some embodiments. When the onDurationTimer is set to a value of m, and n denotes the subframe in which the timer is started according to 3GPP TS 36.321, this is also the subframe where MAC entities change. The behavior of the onDurationTimer intended is shown in the table of FIG. 26. If going out of service by either TAT expiry as shown in the call flow of FIG. 41, or by an acknowledged switch for early TAT expiry as in the call flows of FIG. 39 or FIG. 40, the UE and network node may change to DC-oos at subframe n in the beginning of the next on-duration phase, as specified for the DC-oos started after the Time Alignment Timer expiry. If moving to INS, as shown in the call flows of FIG. 42 or FIG. 43, the UE and network node may change to DC-INS after resynchronization by random access at subframe n in the beginning of the next on-duration phase, as specified for DC-INSm that follows upon exchange of DRX-config and a successful completion of the associated RRC connection reconfiguration procedure.

Figure 27:
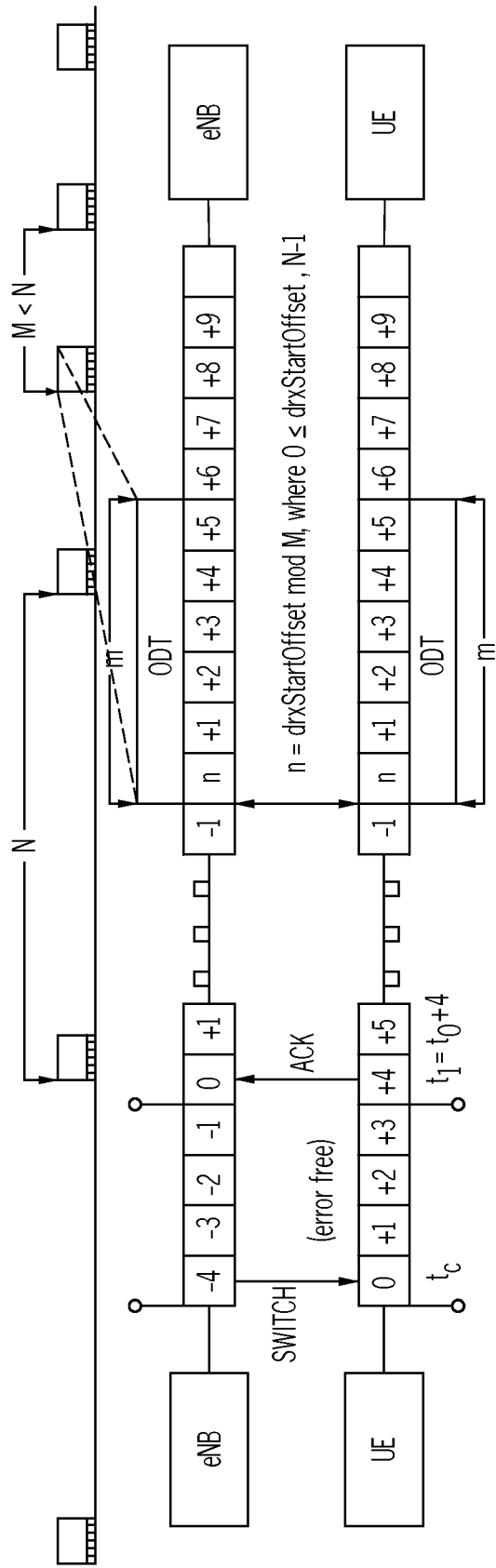
FIG. 27 illustrates handling of the SWITCH mode received by the UE.
Figure 42:
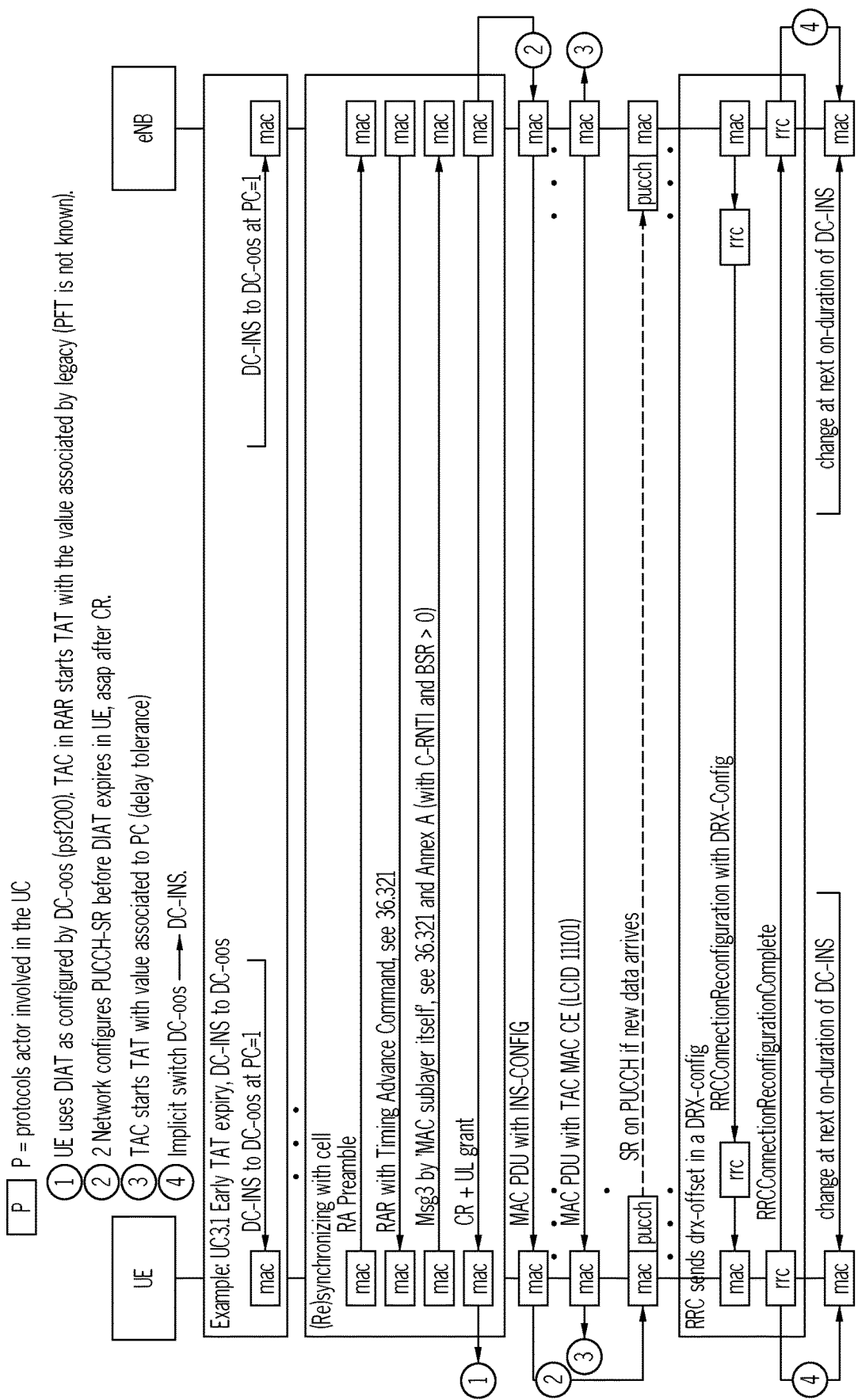
Figure 43:
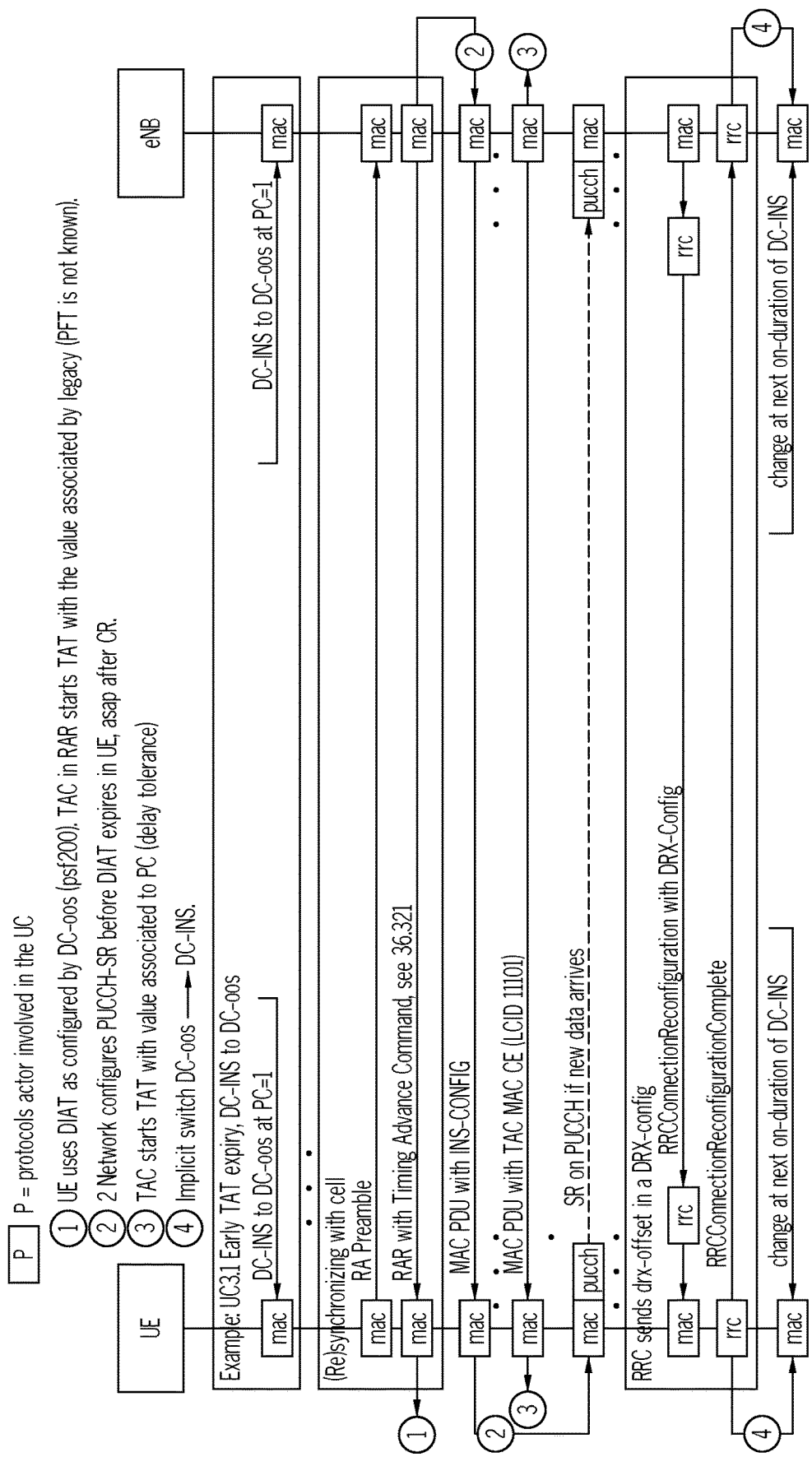

For staying INS mode by an acknowledged switch, as shown in the call flows of FIG. 42 or FIG. 43, the UE and network node may change at subframe n in the beginning of the next on-duration phase, as specified for the new DC-INS. Specifically, particular concern may be taken if the switch imposes a change of the LDC. For example, in a first case, L>N, where L is the New LDC, and N=is the LDC configured by RRC, i.e. the LDC with a drxStartOffset where 0≤drxStartOffset<N−1: maintain same drxStartOffset. As another example in a second case, M<N, where M is the New LDC, and N=is the LDC configured by RRC, i.e. the LDC with a drxStartOffset where 0≤drxStartOffset<N−1; change to a drxStartOffset=(drxStartOffset mod M)=remainder (drxStartOffset/M). FIG. 27 illustrates the special handling for the second case, according to some embodiments. Referring to FIG. 27, for DC=15 (PFT RELEASE), a switch indication is received by UE on subframe s, such that the corresponding activation shall occur at the beginning of subframe s+4.

Figure 28:
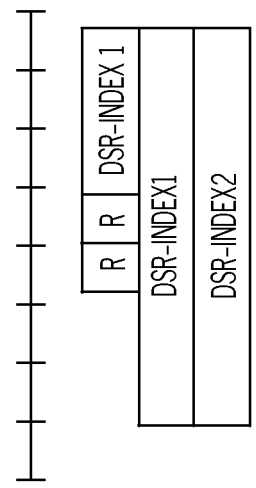
FIG. 28 illustrates the message body for INS-CONFIG on the downlink.

FIG. 28 illustrates the message format for PMB for INS-CONFIG, according to some embodiments. The size of the PMB for INS-CONFIG is 5+16 bits. The message may include DSR-INDEX1, a replica of 3GPP IE sr-PUCCH-ResourceIndex as shown in the left column of the table of FIG. 29. The message for PMB for INS-CONFIG may include DSR-INDEX2, which is a replica of 3GPP IE sr-ConfigIndex as shown in the right column of the table of FIG. 29. The fields marked R may be reserved and set to 0 in some versions of the protocol. The two parameters DSR-INDEX1 (11 bits) and DSR-INDEX2 (8 bits) define a D-SR resource on a portion of PUCCH which is dedicated for the UE. The DSR-INDEX1 determines the PUCCH SR resource locations and the DSR-INDEX2 determines the subframes where D-SR can be transmitted. For an INS-CONFIG received on subframe s, the UE may use the SR resource at its next opportunity.

Figures 28, 29, 30:
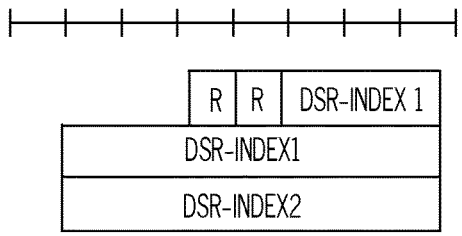
FIG. 29 illustrates tables for the DSR indices for DSR CONFIG on the downlink.
FIG. 30 illustrates A table of Connection Inactivity supervision values.

Referring to FIG. 29, $n_{PUCCH,SRI}^{(1,p)}$ indicates the code-frequency locations of the D-SR resource. As defined in 3GPP TS 36.213, clause 10.1.5, this corresponds to IE sr-PUCCH-ResourceIndex in 3GPP TS 36.331. Still referring to FIG. 29, $I_{SR}$, as indexed by 3GPP TS 36.314, clause 10.1.5, corresponds to IE sr-ConfigIndex in 3GPP TS 36.331. $SR_{PERIODICITY}$ indicates the re-occurring D-SR opportunity, whereas the $N_{OFFSET,SR}$ indicates the subframe offset of the D-SR opportunity. The values in the table of FIG. 29 may be hardwired and mutually understood ahead of time between the UE and the network.

Unknown, unforeseen and/or erroneous cases need to be handled, as will now be discussed. Values and fields that are reserved may not be used in at least some embodiments. The receiving MAC entity may ignore fields that are reserved. The MAC extension element may be selectively discarded when fields such as N, PFT, PMT or PMB are found to be used in an invalid way. The handling of other MAC SDUs and MAC Control Elements in the MAC PDU may not be affected by such erroneous use of MAC EEs. In the event that the UE receives a data radio bearer configuration mapped to a repurposed LCID, the UE may stop the PFT and treat the LCID as a logical channel DTCH in accordance with the received configuration.

Transactions with higher priority DTCHS may need to be handled. Normally the UE may be connected to more than one access point in the core network domain. The PFT is a control function for the default bearer that is used to connect to the Internet APN. It may be important to apply this protocol with care so that negative impact on the latency for IMS services is avoided. For that reason the UE and network may be prepared to conclude a full stop of the PFT and revert to DRX and Active Time, as configured by the RRC. A full stop may be achieved by implicitly releasing the PFT on each side. In the event that RRC reconfigures with a DRX-Config (set with the choice <setup> or DRX-Config-v1130) on some other occasion than to configure new resources for a dedicated IMS GBR bearer such as QCI=1 or QCI=2, the peer parties may continue with the PFT context by just adopting the <offset> from the RRC reconfiguration. Peer parties may revert to the last configured C-DRX configuration when there is a PFT release or at the trigger of switch with DC value <1110> (i.e. PFT SUSPEND). This may exclude the case when the DRX-Config uses choice <release>, and instead the peer parties may each implicitly releases the PFT (i.e. DRX is a prerequisite for PFT). In the event that the UE detects activity on a data radio bearer configuration mapped to QCI=5 (covered also by a broader restriction <mapped to logical channels with higher priority>), the UE may take appropriate actions to partially halt the PFT and revert to the C-DRX configuration as configured by RRC. The network node may make sure that the discontinuous operation of the UE is adjusted, as triggered by FAPPI from UE or by own detection of activity on logical channels with higher priority. Particular care may be taken to default the IMS bearer on QCI=5 and dedicate the IMS GBR bearers such as QCI=1 and QCI=2. Similar care and concern may be taken when attempting to engage with the PFT. For example, the UE may not send the initial message to engage with PFT at times when higher priority signaling and/or data traffic occurs.

Consideration may be necessary for when the Time Alignment Timer is activated in reference to a Time Alignment Command (TAC). In the absence of data and/or RRC control, the network node may not maintain UL time alignment. In this case, the network may not send a TAC such that the TAT will expire. This behavior aligns with the behavior of legacy systems but with a difference in that legacy systems also support the infinite TAT value. The infinite TAT value will make the network use TAC with regularity to have the UE remain time adjusted to the UL transmission. The infinite TAT value may not relevant for this particular PFT described herein.

In some embodiments, consideration may be provided for Connection Inactivity (CIAT) supervision. CIAT may be maintained by the network node, according to some embodiments. The network node may use a value which is greater than TAT as illustrated in the table of FIG. 30. CIAT uses the TAT if Single TAT. Long-TAT if Double TAT. The CIAT column of FIG. 30 shows a recommended value of TAT for use for various configurations. As a default, values configured by Non-PFT legacy (RRC) may be used. The network node may not immediately begin to activate a CIAT value associated to the PFT, but rather wait and act on a next new transmission or a valid reception of a MAC SDU on a logical channel corresponding to a DRB, according to some embodiments. As long as the timer is not activated, the network node may use Non-PFT legacy methods for inactivity supervision and for releases triggered. Legacy methods may imply that while data is absent, the network node does not restart CIAT.

Consideration may be given to use of the switch command in the context of FAPPI. The DC and PC used in a switch are typically set to the same values as that desired by the UE. In other words, the DC and DT are used in an associated FAPPI, but there may be exceptions to this case. The network node may have extra internal input, such as, for example, data or expected data in the DL buffers. The network node may want to reduce signaling, and subsequently extend the time in oos or the connection time. The previous example may be realized as an immediate response with PC=0 although DT may be set to 1 in FAPPI, or handled as a delayed response with PC=1. The latter example could be realized as an immediate response with PC=1 for oos, although the UE uses DT=0 (desire to remain INS) or DC=0 (desire to release) or handled with delayed response with an early RRC connection release.

The Protocol Feature Type (PFT) described herein may interact with the logical channel prioritization procedure. In some embodiments, shortcuts may be made to realize a proper interaction with the Logical Channel Prioritization procedure. The PFT may only be established to support the EPS bearer for mixed MBB, i.e. the default bearer which connects the UE to the Internet APN. As described above, the PFT is either stopped or partially halted when higher priority data for other APNs occurs. The shortcuts may nevertheless be consistent with the following list relative priority in decreasing order. The logical channel may be mapped to the EPS bearer for mixed a MBB and referred to as X. In a decreasing order of relative priority, the following actions may occur for logical channel prioritization:

MAC control element for C-RNTI or data from UL-CCCH;

MAC control element for BSR, with exception of BSR included for padding;

MAC control element for PHR, Extended PHR, or Dual Connectivity PHR;

data from any Logical Channel DCCH and DTCH, with higher priority than X;

data from X including MAC extension elements;

MAC control element for BSR included for padding.

Actions related to the case of DC=13 and the DRX MAC CE command will now be discussed in further detail. This PFT allows the UE to trigger an early expiry of DIAT. As illustrated by the call flow of FIG. 46 the FAPPI may be used. For a message with DC=13, the network node may be triggered to send the DRX Command with standard LCID=11110. As previously shown in the table of FIG. 21, SDC may not be used in the non-legacy cases since peers acts as if the shortDRX RRC IE is excluded. This behavior may be contrary to legacy C-DRX, where short DRX cycles may have been configured by RRC. However, as long as the PFT is running, the DRX command may trigger a transition to DRX cycles according to the configured Long DRX cycle. The peers may stop DIAT when the DRX command is received in accordance with the standard specification. Particularly, peers may not subsequently immediately start or restart DIAT as a consequence of the new data indication on the associated PDCCH transmission. The network node may not stop and wait for an acknowledged reception but may halt DIAT as soon as it transmits the DRX command. Thus, the network node may use the DRX command to trigger peers to use the Long DRX cycle, and also if the PFT is suspended but running with C-DRX (after DC14).

In some embodiments, the network may occasionally need to discard a FAPPI and may therefore not trigger the DRX command. For these cases the UE may repeat a FAPPI with DC=13 once more without restarting the FAPPI prohibit timer. The reason for the network node to discard a FAPPI with DC=13 may be congestion in the network or simply that there is data in the transmission buffers for a DRB or SRB. Other reasons for the network node to discard a FAPPI may be that C-DRX does not support it.

Figure 31:
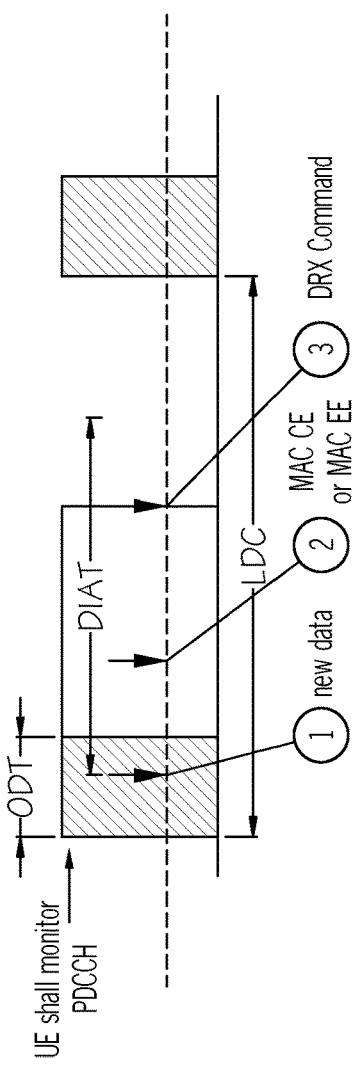
FIG. 31 illustrates handling of the DIAT.

In some embodiments, additional considerations may be necessary to handle DIAT. The peers may start/restart DIAT as a consequence of new data indication on PDCCH. Particularly for downlink cases, only if the associated PDSCH (DL) transmission includes higher layer SDUs, with LCID in range 00000-01010 that are not used to identify a MAC extension element such as switch or INS-CONFIG. For PDSCH transactions that contain nothing but MAC CEs and MAC EEs other than the DRX Command (standard MAC CE with LCID=11110 on DL-SCH), the DIAT is left running. FIG. 31 illustrates an embodiment of handling of the DIAT showing when to start and when to shortcut DIAT. The UE and network node may not use DIAT unless TAT is running.

It may be necessary to handle misdetections and misdeameanors related to the handing of discontinuous operation. When discontinuous operation is used and changes are made to its pattern, there are several corner-cases where the communication temporarily fails, according to some embodiments. The network node will use proprietary methods to make as failsafe communication as possible, as show in illustrative examples in FIGS. 32 to 35 of what occasionally may go wrong and what sort of methods that can be used to recover. Although exact details will not be specified, a discussion will follow of what is required from both ends to recover. The duplicate discard as specified for the switch Message, the FAPPI Message and the INS-CONFIG Message is an example of such a requirement.

Figure 32:
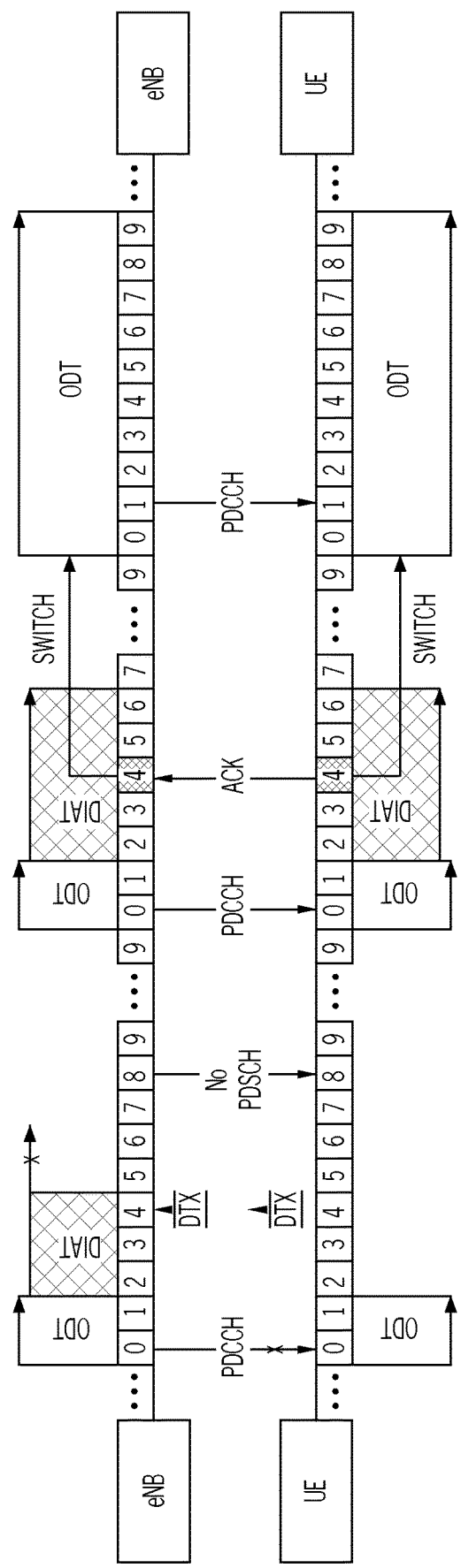
FIGS. 32 to 35 illustrate recovery from various errors.
Figure 33:
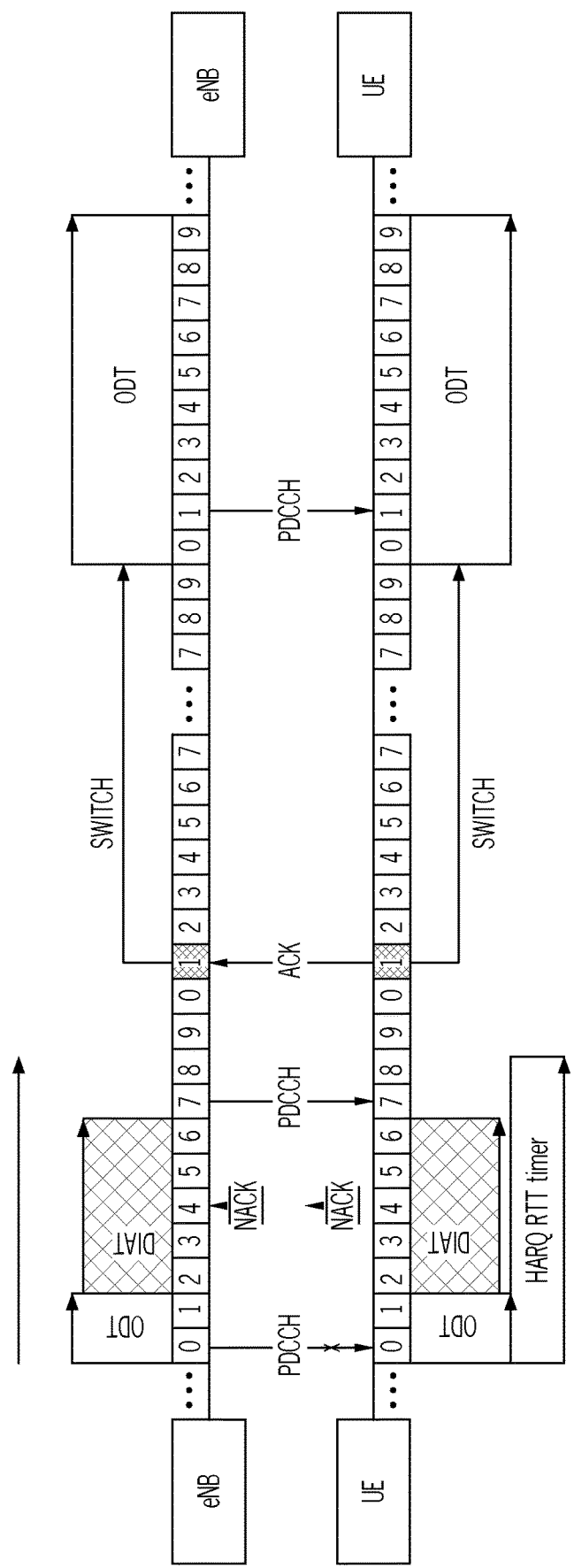
Figure 34:
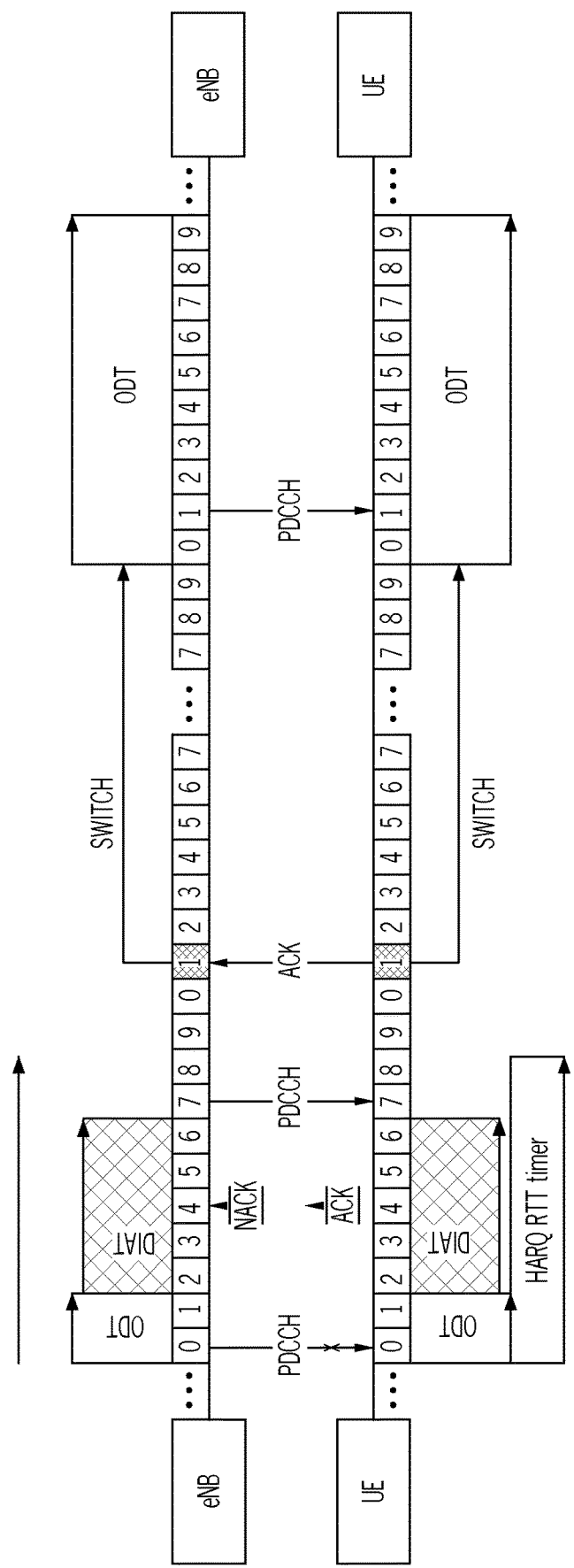
Figure 35:
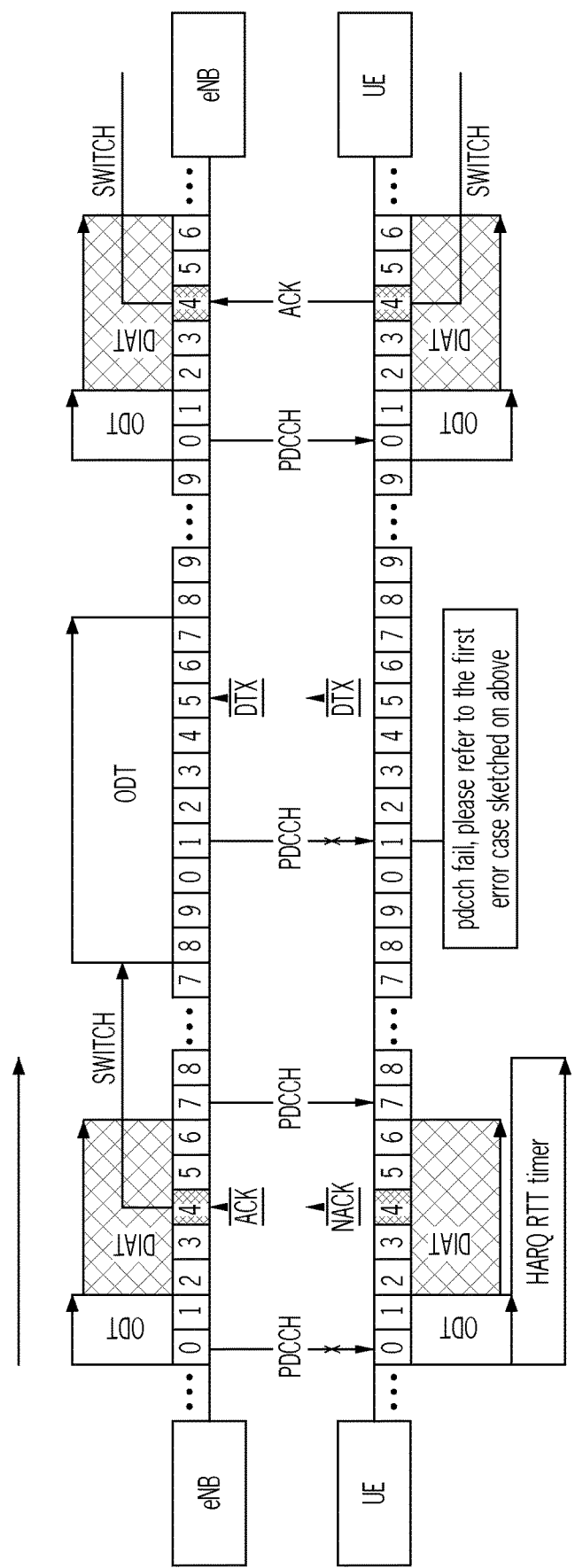

FIG. 32 illustrates the PDCCH Fail case, according to some embodiments. Referring to FIG. 32, the network node detects an error and postpones the transmission to a next failsafe portion of Active Time. The network node then sends a duplicate of the switch. FIG. 33 illustrates the NACK on PDSCH case. Referring to FIG. 33, the network node retransmits as per baseline, upon receipt of the NACK. FIG. 34 illustrates a ACK to NACK error case. Referring to FIG. 34, the network node and the UE delay its trigger to switch until an ACK is received. FIG. 35 illustrates the NACK to ACK case. Referring to FIG. 35, the network node may detect an error. The network may then send a duplicate of the switch command to the UE.

Numerous embodiments will now be explained with regard to several uses cases. It is to be understood by a person of ordinary skill in the art that one or more of these embodiments may be implemented separately, and that these embodiments may be combined in various combinations for implementation. PFT announcement may be performed according to various embodiments, as described above, but will not be described further here. PFT establishment will now be discussed in detail, according to the call flow of FIG. 36.

Referring to FIG. 36, the PFT establishment may initiated by the UE. The UE initiates PFT establishment by indicating the PFT in an initial message, according to some embodiments. The network node responds to the invite with a handshake message. The TAT may be applied and/or changed at some subsequent TAC. The UE may send DT and a desired DC in some subsequent FAPPI. The DRX may be changed according to values used in DC and PC in some subsequent switch. The UE may not continue the sequence of events unless it has a valid reception of the announcement message, according to some embodiments. The UE shall not engage with the PFT unless DRX is configured. The network node may enable options which are enabled by the UE capabilities. The PFT establishment may fail unless the HARQ delivery of the handshake message is successful. It should be noted that some operations have been added to illustrate legacy operations. One or optionally two TAT values which may be used for the PFT may be configured. The TATDEF method to activate and start TAT by TAC may be described in relation to FIGS. 39 to 47 with respect to DRX Switching and in the description of the Message Body for TATDEF on DL-SCH.

Figure 37:
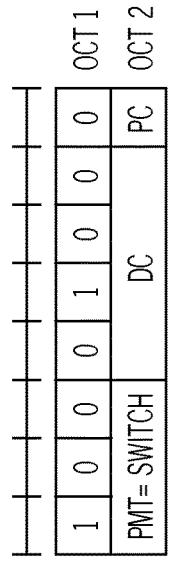
FIGS. 37 and 38 illustrate formats for DRX switching.
Figure 38:
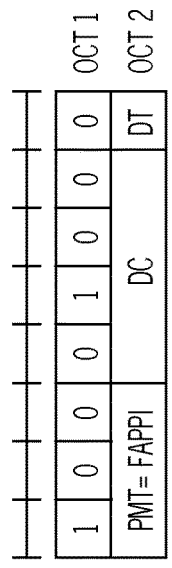

DRX switching will now be discussed in detail. DRX switching may be controlled by explicit signaling or may be implicitly prompted at each peer end by an expiry of the commonly shared Time Alignment Timer, according to some embodiments. The explicit DRX switching may be initiated by the UE or the network node. The UE triggered DRX switching uses FAPPI with a content that is based on internal events in the UE. The various code points for DC and DT are described in Message Body for FAPPI on UL-SCH. FIG. 37 illustrates the message format for FAPPI on UL-SCH for 0001≤DC≤1110. The network node may use a switch command to reconfigure the DRX configuration in the UE. The various code points for DC and PC, and also the switching time, are described earlier in Message Body for switch on DL-SCH. The switch may be sent as an immediate or delayed response to FAPPI in the UE triggered DRX switching, or as triggered by other internal events in the network. FIG. 38 illustrates the message format for FAPPI on UL-SCH for 0001≤DC≤1110. The DC and PC that are used in a switch command are typically set to the same values as that of the DC and DT used in the associated FAPPI, but the protocol allows them to be different.

Figure 39:
FIGS. 39 to 47 illustrate message flows between the network node and the UE, according to some embodiments described herein.

FIG. 39 illustrates the call flow for early TAT expiry that is triggered by the UE. The UE may send a FAPPI message to indicate DT=1 and may include its desired pair of DRX configurations, according to some embodiments. The network node may acknowledge empty buffers and send a switch message with PC=1. The TAT expires as an immediate result and the configuration is prepared for a change to DC-oos and Short-TAT, which is the TAT value associated to PC=1. The UE may not engage in the switch unless it has a valid reception of at least one Timing Advance Command MAC control element (LCID 11101) subsequent to handshake, according to some embodiments. The TAC may be a prerequisite of the call flow of FIG. 39.

Figure 40:
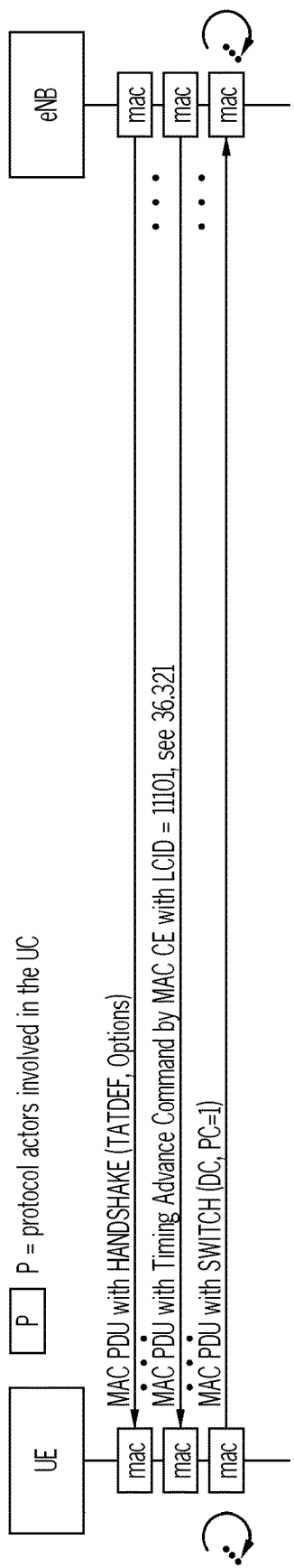

FIG. 40 illustrates the call flow for early TAT expiry that is triggered by the network node. The network node sends a switch command to configure a pair of DRX configurations, according to some embodiments. The network node may send the switch command with PC=1. The TAT expires as an immediate result and the configuration may be prepared for a change to DC-oos and Short-TAT (the TAT value associated to PC=1). The network node may not initiate this sequence of events unless it has sent at least on Timing Advance Command MAC control element (LCID 11101) subsequent to handshake and received HARQ ACK from UE. The UE may not engage in the switch unless it has a valid reception of at least one Timing Advance Command MAC control element (LCID 11101) subsequent to handshake. The message body for TATDEF on DL-SCH and Message Body for switch on DL-SCH may include further details. The TAC may be a prerequisite of the call flow of FIG. 40.

Figure 41:
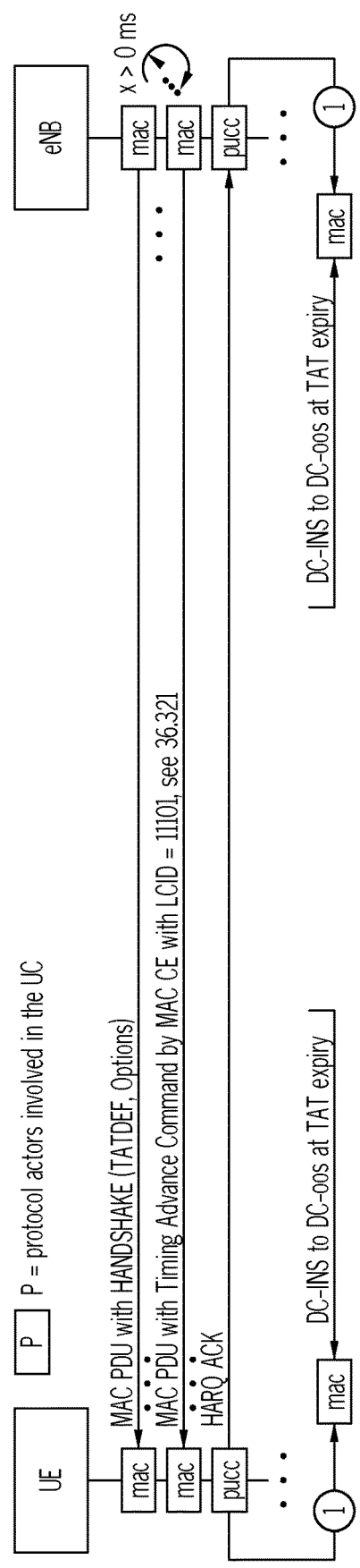

FIG. 41 illustrates the call flow for implicit DC-INS to DC-oos, according to some embodiments. The TAT as defined by TATDEF expires and the DRX may be reconfigured to what has been set previously by DC-oos. The UE may not engage in the switch unless it has a valid reception of at least one Timing Advance Command MAC control element (LCID 11101) subsequent to handshake, according to some embodiments. The network node may not engage unless it has had a successful HARQ delivery of at least one such TAC. The TAC may be a prerequisite of the call flow of FIG. 41.

FIG. 42 illustrates the call flow for implicit DC-oos to DRX Configuration-In Synch Contention Based Random Access (DC-INS-CBRA), according to some embodiments. The user data plane in the UE may change from no longer being delay-tolerant. FIG. 42 provides an example of what could first have caused the UE to enter DC-oos. The UE uses random access to resynchronize. The UE may or may not send FAPPI to indicate a change in its current delay tolerance and its desired pair of DRX configurations (not shown). The UE receives TAC as part of RAR and starts/restarts TAT as described by legacy systems. The network node sends an INS-CONFIG with PUCCH-SR resources to use while the TAT is running. The network node subsequently sends TAC to trigger restart of TAT with the TATDEF value associated to PC (PC=0, 1, X). The switch point DC-oos to DC-INS is delayed and aligned with the next on-duration that follows upon the exchange of DRX-Config and a successful completion of the associated RRC Connection Reconfiguration procedure. The UE may not send or append a FAPPI message unless it uses DC-INS. There may be other reasons for the UE to synchronize/re-synchronize than a sudden change in the user data plane to no longer being delay-tolerant. It may be so that there has not been such a change, but rather that the user data plane has remained not delay-tolerant for some period of time. The reason for the UE to resynchronize may thus instead be that it has reverted from D-SR to RA-SR based on a maximum number of D-SR attempts. It could also be so that UE needs to execute a control plane procedure, such as responding to a PDCCH order or to send DCCH, for example, with intent to send a Measurement Report, as illustrated in the call flow of FIG. 57.

FIG. 43 illustrates the call flow for implicit DC-oos to DC-INS-Non-CBRA, according to some embodiments. The user data plane in the UE changes from no longer being delay-tolerant. FIG. 43 illustrates an example of what could first have caused the UE to enter DC-oos. The UE resynchronizes with a dedicated preamble. The UE may or may not send FAPPI to indicate a change in its current delay tolerance and its desired pair of DRX configurations, which is not shown in FIG. 43. The UE receives TAC as part of RAR and starts/restarts TAT. The network node sends INS-CONFIG with PUCCH resources to use while TAT is running. The network node subsequently sends a TAC to trigger restart of the TAT with the TATDEF value associated to a PC (PC=0, 1, X). The switch point DC-oos to DC-INS is delayed and aligned with the next on-duration that follows upon the exchange of DRX-Config and a successful completion of the associated RRC Connection Reconfiguration procedure. An additional optional signal INS-CONFIG may be involved in this case. There are other reasons for the UE to synchronize/re-synchronize than a sudden change in the user data plane to no longer being delay-tolerant. In some embodiments, there may not have been such a change, but the user data plane may have remained not delay-tolerant for some period of time. The reason for the UE to resynchronize may be that it has reverted from D-SR to RA-SR based on a maximum number of D-SR attempts. It could also be that the UE needs to execute a control plane procedure, such as responding to a PDCCH order, which is a trigger for this case illustrated by FIG. 43, or may need to send DCCH, such as for example, with intent to send a Measurement Report, as illustrated in the call flow of FIG. 57.

Figure 44:
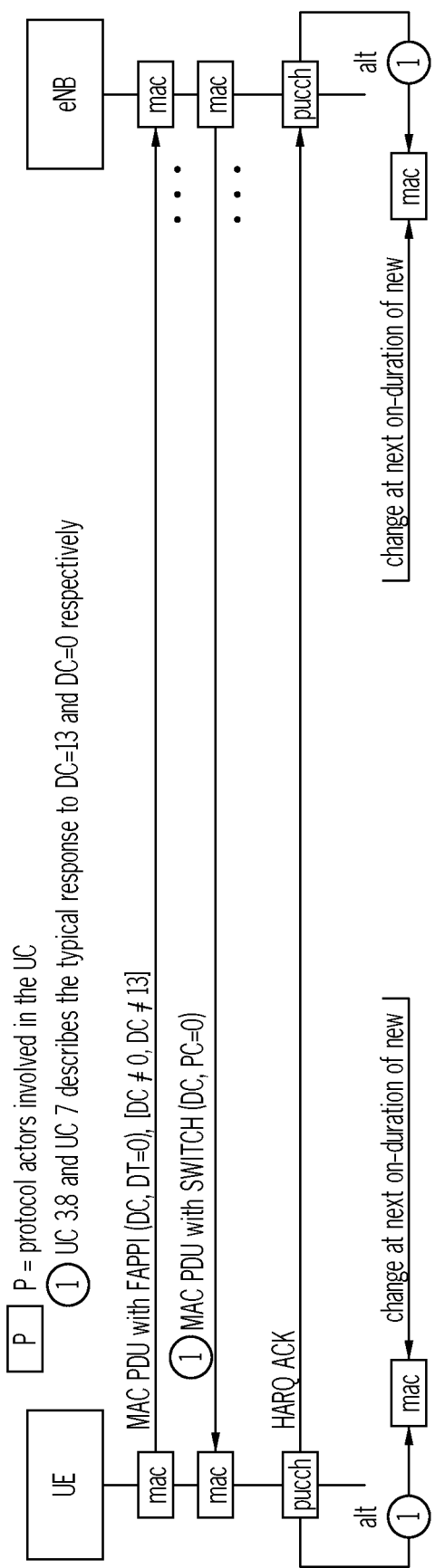
Figure 66:
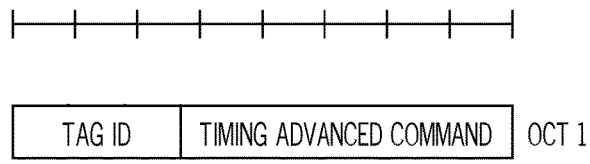
FIG. 66 illustrates the format for the Timing Advance Command.

FIG. 44 illustrates the call flow for explicit DC-INS to DC-INS signaling that is triggered by the UE, according to some embodiments. The UE may send a FAPPI message to indicate the current delay tolerance and its desired pair of DRX configurations. The network node may send a switch message with PC=0, whereby the DRX is changed to the configuration set by the new DC-INS. The UE and network node may change to the indicated configuration at subframe n in the beginning of the first on-duration phase, as specified for DC-INS of the new DRX configuration, started after acknowledged exchange of the MAC PDU including the switch message. When the onDurationTimer is set to a value of m, and n denotes the subframe in which the timer is started according to 3GPP TS36.321, this is also the subframe where PFT entities change. The UE may not initiate this sequence of events unless it has a valid reception of the handshake message for the current connection and cell. FIG. 65 and FIG. 66 provide the message body format for the switch message on DL-SCH. Still referring to FIG. 44, explicit DC-INS to DC-INS signaling that is triggered by the UE involves FAPPI and switch messages, according to some embodiments. The FAPPI message that triggers change with DC=15 may be handled according to the call flow of FIG. 52. The FAPPI message that triggers change with DC=0 may be handled according to the call flow of FIG. 61. The peers may remain with the TAT defined by TATDEF when the PFT is suspended by DC=14.

Figure 45:
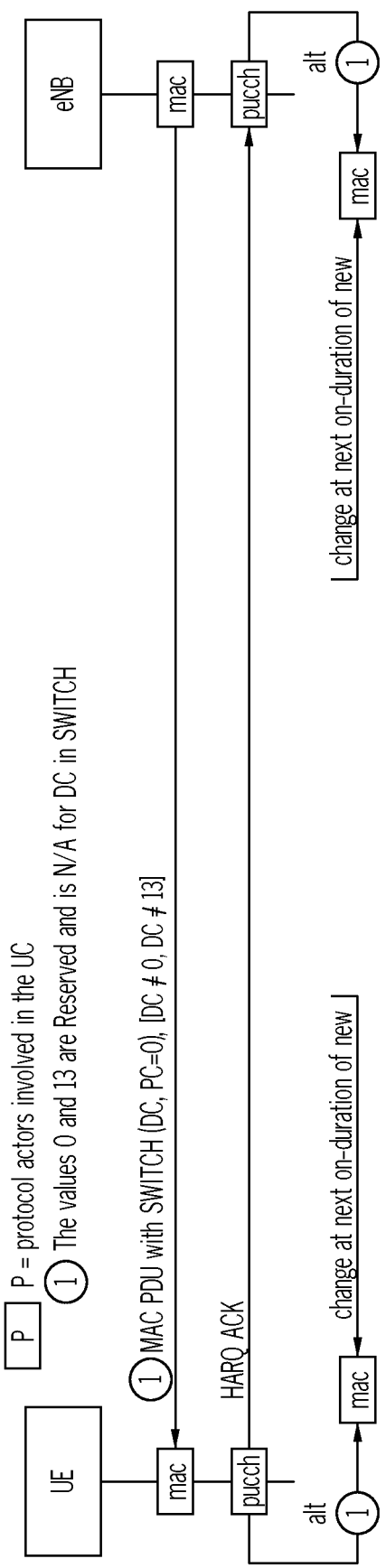

FIG. 45 illustrates the call flow for explicit DC-INS to DC-INS signaling that is triggered by the network node, according to some embodiments. The network node sends a switch message with PC=0, whereby the DRX is changed to the configuration set by the new DC-INS. The UE and the network node change to the indicated configuration at subframe n in the beginning of the first on-duration phase, as specified for DC-INS of the new DRX configuration, and started after acknowledged exchange of the MAC PDU including the switch message. When the onDurationTimer is set to a value of m, and n denotes the subframe in which the timer is started according to 3GPP TS36.321, this is also the subframe where the PFT entities change. The network node may not send a switch message unless it has sent a handshake message and received a HARQ ACK from UE. FIG. 65 and FIG. 66 provide an example message body format for the switch message on DL-SCH. Peers may remain with the TAT defined by TATDEF when the PFT is suspended by DC=14.

Figure 46:
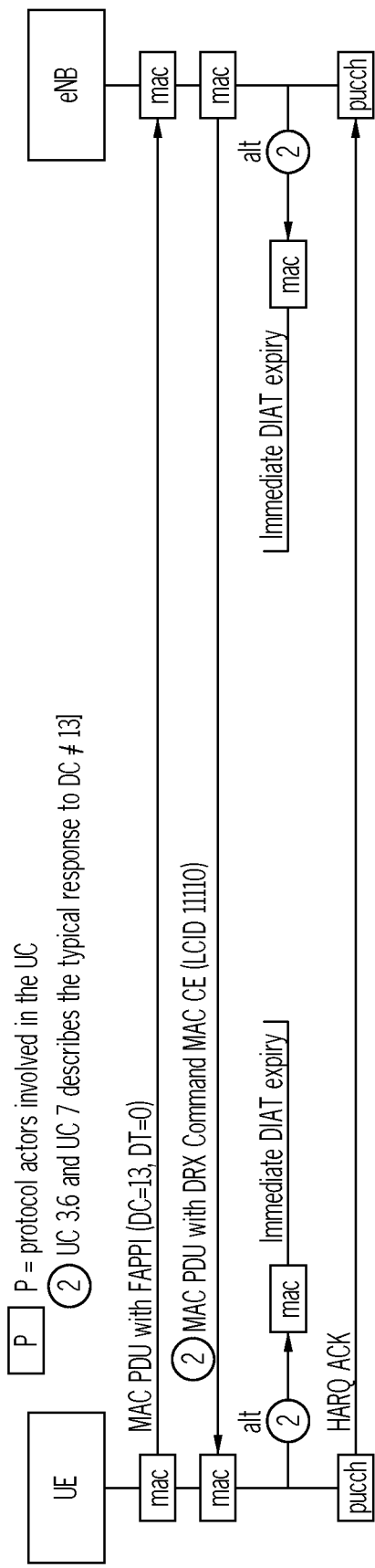

FIG. 46 illustrates the call flow for early DIAT expiry that is triggered by the UE. The UE sends a FAPPI message to indicate the current delay tolerance and its desired pair of DRX configurations. The network node sends a DRX Command MAC CE. The UE and the network node may stop all Active Time timers as described by 3GPP 36.321 (onDurationTimer, and also DIAT). The UE may not initiate this sequence of events unless it has a valid reception of the handshake message for the current connection and cell. FIG. 65 and FIG. 66 provide an example message body format for the switch message on DL-SCH. According to FIG. 45, FAPPI and the DRX command MAC CE are involved in the early DIAT expiry that is triggered by the UE. A FAPPI triggered change with DC=0 may handled according to another case that is illustrated by the call flow of FIG. 61. Still referring to FIG. 45, the DRX Command may not switch to a new DC-INS, but instead, the present DC-INS may remain, according to some embodiments. The UE may act the same at reception of the command no matter what could have been the trigger used by the network since the PFT takes precedence over any other non-PFT usage of the DRX command. The DRX command may triggers peers to use the Long DRX cycle, if the PFT is running with C-DRX and short DRX cycles (after PFT SUSPEND with DC=14), which is in contrast to when the PFT is not running.

Figure 47:
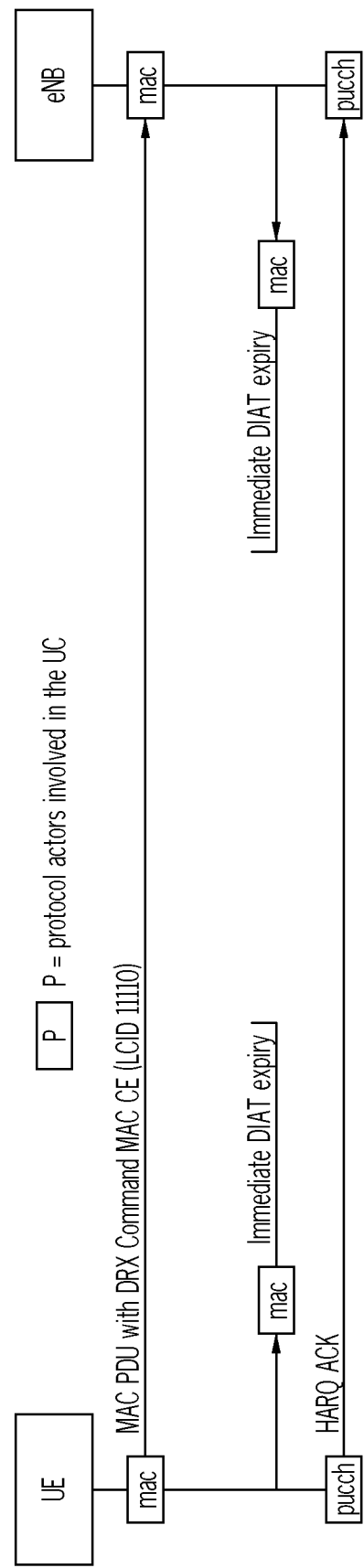

FIG. 47 illustrates the call flow for early DIAT expiry that is triggered by the network node. The network node may send a DRX Command MAC CE, according to some embodiments. The UE and network node stop all timers supervising Active Time as described by 3GPP 36.321 (onDurationTimer, and also DIAT). FIG. 65 and FIG. 66 provide an example message body format for the switch message on DL-SCH. Still referring to FIG. 47, the DRX Command may not switch to a new DC-INS, but instead, the present DC-INS may remain. The UE may behave the same at reception of the command no matter what could have been the trigger used by the network since the PFT takes precedence over any other non-PFT usage of the DRX command. The DRX command may trigger peers to use the Long DRX cycle, if the PFT is running with C-DRX and short DRX cycles, after PFT SUSPEND with DC=14, which is in contrast to the case if PFT is not running.

FIG. 48 illustrates the message format for the PFT Release. The PFT Release may be controlled by explicit signaling or it may be implicitly prompted at each peer end, according to some embodiments. The explicit PFT release may be initiated by the network node and be based on internal events which may be triggered by FAPPI. FIG. 48 illustrates the message format for a FAPPI message on UL-SCH with DC=15 for PFT Release. FIG. 49 illustrates a table including the DC=15 case in a FAPPI message on UL-DCH. Unlike other DC values, the DC=15 case does not depend on the status of time alignment timer in the UE. The table of FIG. 49 may be hardwired and mutually understood ahead of time between the UE and the network node. The UE may use uses DC=15 (PFT RELEASE) to indicate a desire to release the PFT, which in the context of the table of FIG. 49 implies a desire to switch to legacy C-DRX. The network node may use a switch message to release the PFT, according to the message format of FIG. 50, which illustrates the switch message on DL-SCH with DC=15 for PFT Release. FIG. 51 illustrates a table including the DC=15 case in a FAPPI message on DL-DCH. Unlike other DC values, the DC=15 case does not depend on the status of time alignment timer in the UE. The table of FIG. 51 may be hardwired and mutually understood ahead of time between the UE and the network node.

FIG. 52 illustrates the call flow for explicit PFT Release that is triggered by the UE. The UE may trigger a PFT release by indicating DC=15 for the PFT in a FAPPI message. The network node may release the PFT by indicating DC=15 for the PFT in a switch message. This operation may occur as illustrated in the call flow of FIG. 44. The UE may reinitiate the PFT later by sending an initial message, as illustrated in the call flow of FIG. 36. The DRX may be changed to the configuration set by higher layers. The UE may not initiate this sequence of events unless it has received both a valid reception of the announcement message as well as a handshake message for the current connection and cell. The peers may revert to the TAT defined by RRC when the PFT is released. Still referring to FIG. 52, the eNB2 may operate in a similar manner to that of eNB1 such that the second initial message is either from a subsequent connection or not sent to the same cell.

FIG. 53 illustrates the call flow for explicit PFT Release that is triggered by the network node. The network node may release the PFT by indicating DC=15 for the PFT in a switch message, according to some embodiments, as illustrated in the call flow of FIG. 45. The UE may reinitiate the PFT later by sending an initial message in another cell or connection, as in the call flow of FIG. 36. The DRX may be changed to the configuration set by higher layers. The network may not initiate this sequence of events unless it has a valid reception of the initial message. The peers may revert to the TAT defined by RRC when the PFT is released. The eNB2 of FIG. 53 in the above illustration may operate in a manner similar to that of eNB1, according to some embodiments. If that is the case, the second initial message may either from a subsequent connection or not sent to the same cell.

Figures 54, 55, 56:
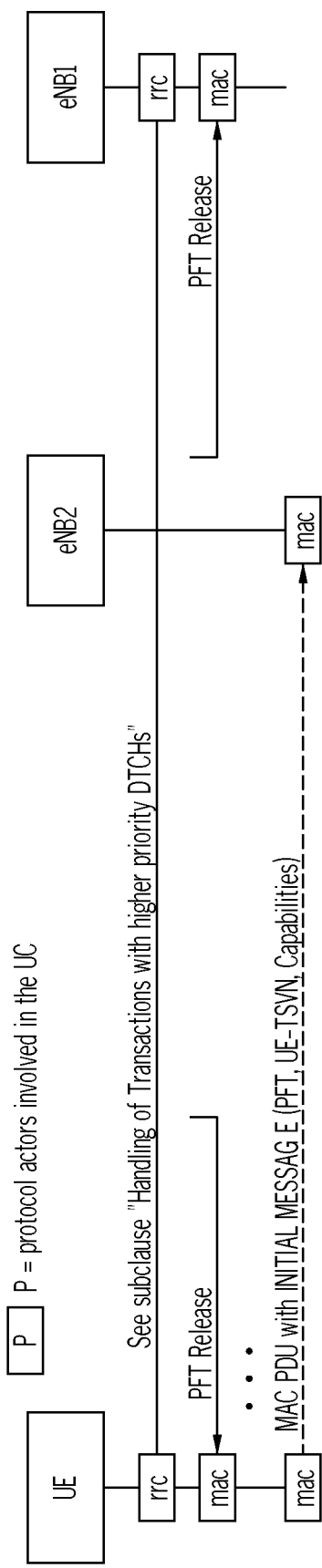

FIG. 54 illustrates the call flow for implicit PFT Release. The PFT is implicitly released and the peer parties revert to the DRX configuration as configured by RRC, according to some embodiments. The peers may revert to the TAT defined by RRC when the PFT is released. Exchange of TAC may be a prerequisite to the operations of FIG. 54. The eNB2 of FIG. 54 may operate in a manner similar to that of eNB1. If that is the case, the second initial message may be either from a subsequent connection or not sent to the same cell.

Handling of Transactions with DCCH for handover with establishment of PFT in the target cell will now be discussed. Handling of the handover must make sure that the UE stays Active and reachable over the Handover time after sending a Measurement Report. The small ODT associated to DC-oos may be too short for such a purpose. Also long LDC values associated with DC-oos may be too short as well. The new PFT establishment may follow upon a switch that releases the PFT (DC=15), according to some embodiments. The new PFT establishment may be executed in the handover target cell. FIG. 55 illustrates a switch message on DL-SCH with DC=15 for PFT Release. FIG. 56 illustrates the DC-field in the switch message on DL-SCH since DC may an index to preconfigured data. The value for the PFT Release case, unlike other DC values, may not depend on the status of time alignment timer in the UE. The values in the table of FIG. 56 may be hardwired and mutually understood ahead of time between the UE and the network node.

Figure 57:
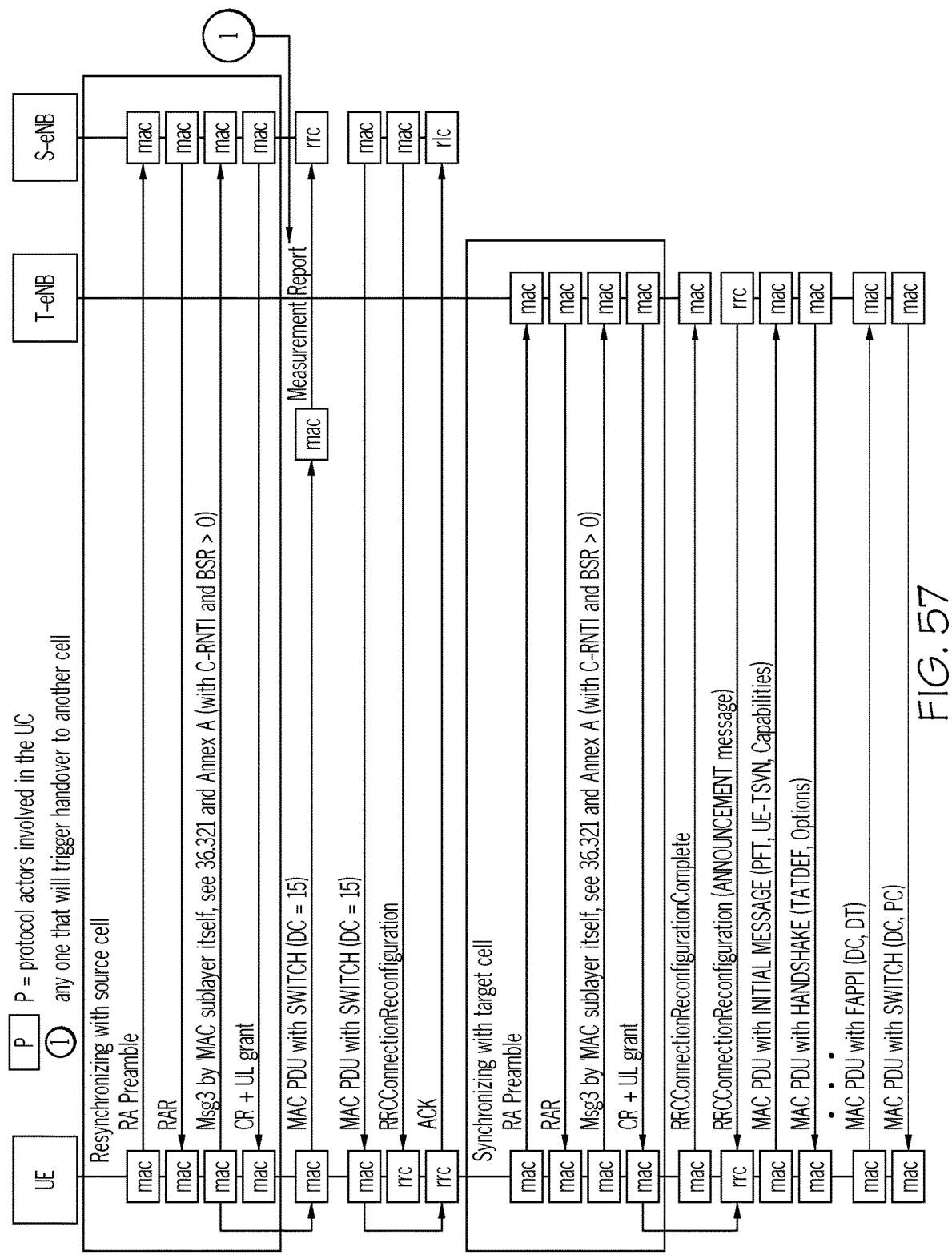
FIGS. 57 and 58 illustrate message flows between the network node in the UE for handover with the establishment of PFT.

FIG. 57 illustrates call flow for handover with establishment of PFT in a target cell that is out-of-service (oos). The UE may initiate a PFT release in the S-eNB (DC=15) and may reconnect in the T-eNB with the PFT by using the initial message, according to some embodiments. The T-eNB part of network responds to the invite with a handshake message, as illustrated in the call flow of FIG. 36. The UE may then send the DT and the desired DC in subsequent FAPPIs. The DRX may be changed according to values used in DC and PC in associated switches. The UE may not initiate the sequence of events with T-eNB unless it has a valid reception of the announcement message in the target cell.

Figure 58:
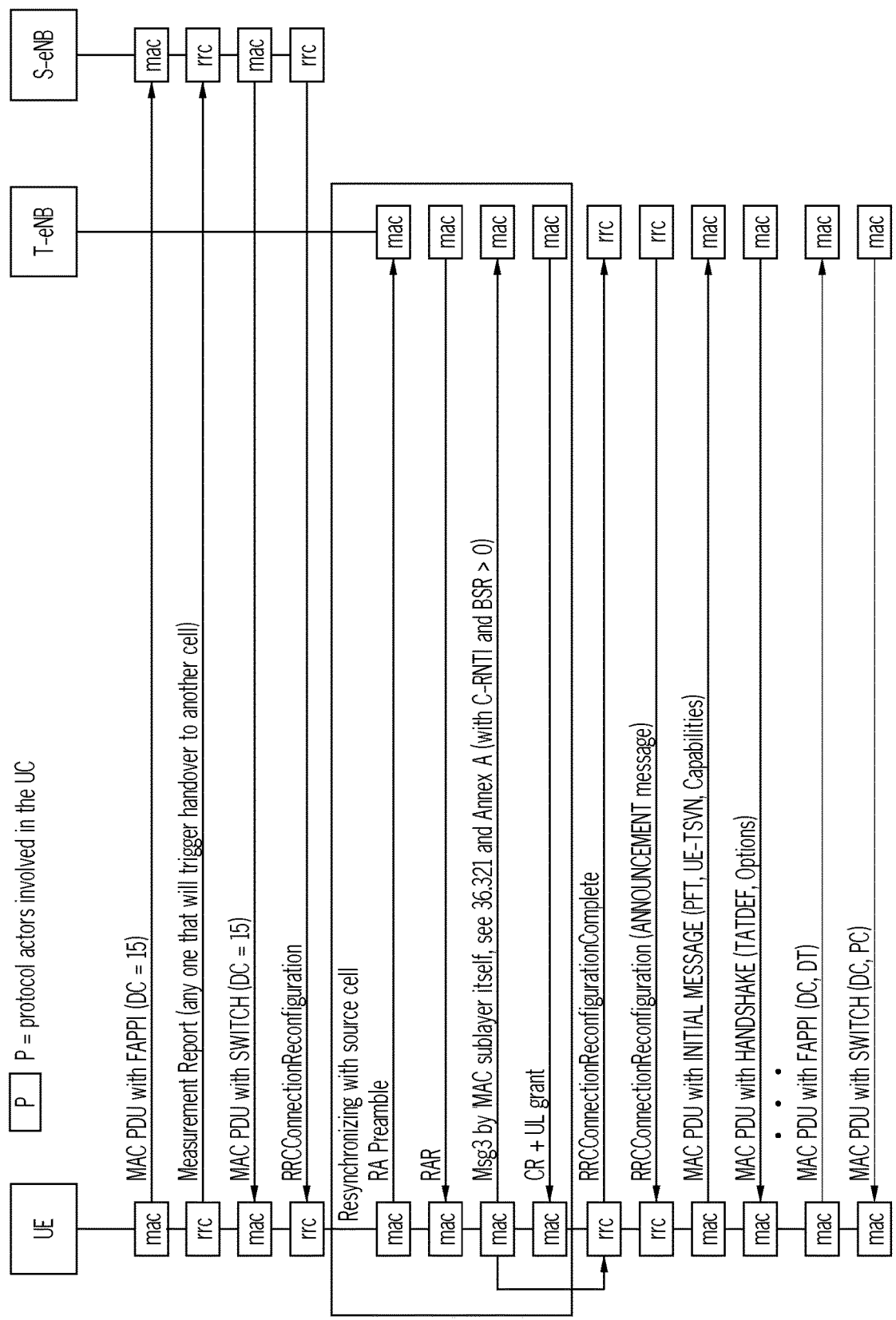

FIG. 58 illustrate call flow for handover with establishment of PFT in a target cell that is INS. The UE may initiate a PFT release in the S-eNB (DC=15) and may reconnect in the T-eNB with the PFT by using the initial message, according to some embodiments. The T-eNB part of network responds to the invite with a handshake message, as illustrated in FIG. 36. The UE then may send the DT and desired DC in subsequent FAPPIs. The DRX may be changed according to values used in DC and PC in associated switches. The UE may not initiate the sequence of events with T-eNB unless it has a valid reception of the announcement message in the target cell. In some embodiments, PFT establishment after radio link failure (RLF) may occur. During UE reestablishment of the RRC connection in a new cell, PFT establishment may occur. When the UE reestablishes the RRC connection in the same cell, PFT establishment may be excluded in some embodiments.

FIG. 59 illustrates the message format for early connection release. The early connection release may initiated by the UE, according to some embodiments. The UE may use an FAPPI message with DC=0 as a trigger. FIG. 59 illustrates an FAPPI message on UL-SCH with DC=0 for early CIAT expiry. FIG. 60 illustrates a table with a DC=0 for the FAPPI message on UL-DCH. The value if DC=0, unlike other DC values, may not depend on the status of the time alignment timer in the UE. The table of FIG. 60 may be hardwired and mutually understood ahead of time between the UE and the network. The UE may use DC=0, early CIAT expiry to indicate a desire to release the connection and switch to IDLE mode and use the I-DRX defined there. The UE may use this value when it has cause to judge that the user data plane is inactive, such that the UE has neither data to upload nor does it have a request to download data. The UE rather uses DT=1 (early TAT expiry) if data is expected but data is delay tolerant.

FIG. 61 illustrates the call flow for early connection release, according to some embodiments. The UE may be triggered by a FAPPI message. The network node may acknowledge empty DL buffers and responds with a normal release. It may be a prerequisite of this case that TAT is running, according to some embodiments. The parties shall act according to the call flow of FIG. 62 with a network node triggered release, if the TAT has instead expired. The network may instead select to switch to DC-oos in accordance with the call flow of FIG. 40 or to switch to DC-INS in accordance with the call flow of FIG. 45 if it has expectations of data in the DL buffers, according to some embodiments.

Figure 62:
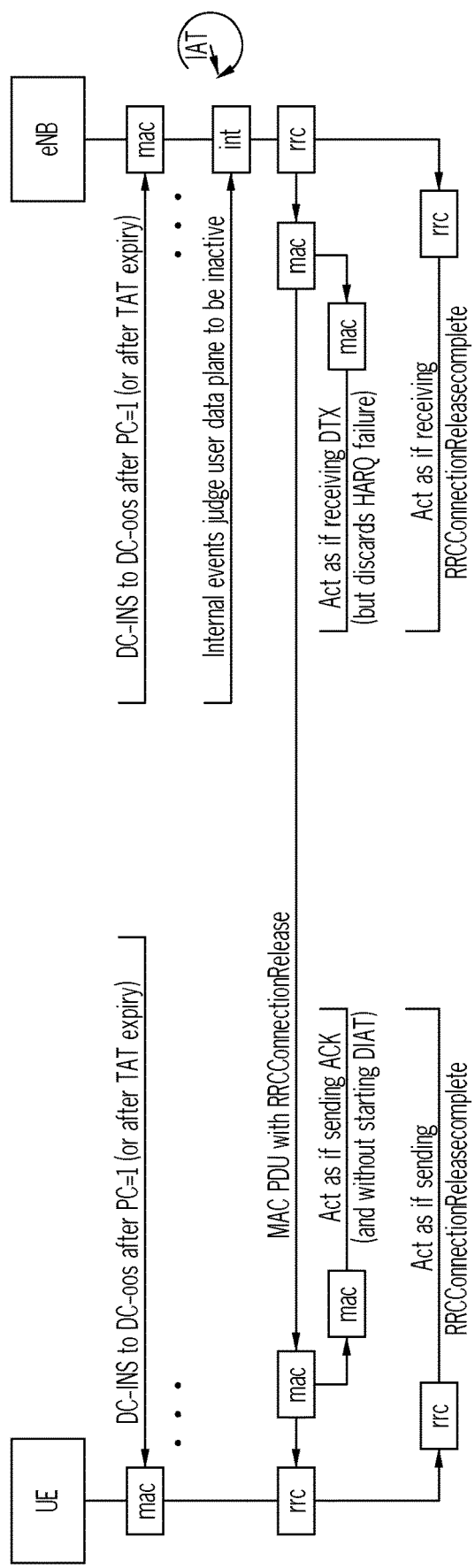

FIG. 62 illustrates an unacknowledged release. The Unacknowledged Release may be initiated by the network node, according to some embodiments. The network node may initiate the release when it has cause to judge that the user data plane and/or the NAS control plane is inactive. The network node may not have data in its buffers and has no reason to expect data and/or NAS control to arrive. Still referring to FIG. 62, the inactivity timers in the network node may expire such that no timers are running, according to some embodiments. The network node may continue the supervision period until the next on-duration phase has started. The network node may then send the RRCConnectionRelease. The UE may stop all Active Time timers as if a DRX command MAC control element had been received, and acts as if it has sent the ACK for the corresponding HARQ process. The UE may also act silently with respect to the RRC Connection Release procedure. The network may not start DIAT and repeats the PDU only at occasions where the on-duration timer is running. The UE and network node finally may behave as if all deliveries associated to the transfer are successful, such as, for example, HARQ delivery, RLC AM delivery, as well as the RRC Connection Release procedure itself. The Unacknowledged Release is optional and depends on the PFT options provided by the network node, according to some embodiments. The peer parties may instead act according to legacy networks, with RACH resynchronization and acknowledged response, if the network has not provided Unacknowledged Release as an option. It may also a prerequisite of the unacknowledged release to occur after TAT has expired, according to some embodiments. The peer parties may behave according to legacy specifications, with an acknowledged response, if TAT is instead running. The network may restart the CIAT timer if a new transmission or a valid reception of a MAC SDU occurs on a logical channel with a content corresponding to a DRB during the inactivity supervision period, according to some embodiments. MAC SDUs may be sent only over LCIDs that are configured by a higher layer, according to some embodiments. A LCID that is repurposed may send MAC EEs, and any such sending or receiving of such may not cause CIAT to restart.

FIG. 63 illustrates the message format of an initial access by the RRC sublayer, which is a total of 12 bytes in length, according to some embodiments. The initial access message of the RRC sublayer include 9 bytes for the uplink grant and 3 bytes for the CRC. The MAC SDU RLC-TM is 48 bits in length and may encapsulate either an RRCConnectionRequest or RRCConnectionReestablishmentRequest.

FIG. 64 illustrates the message format of a message by the MAC layer. The MAC PDU may be 9 bytes in length but the size and content may depend upon the grant. The total message length may be 12 bytes, including a 3 byte CRC.

FIG. 65 illustrates a portion of a table of LCIDs of closely related MAC CES, according to some embodiments. The table of FIG. 65 includes values of LCID for DL-SCH. The Timing Advance Command MAC CE, as specified by 3GPP TS 36.321 has a fixed size and consists of a single octet defined as TAG Identity (TAG Id) and the Timing Advance command. The format of the Timing Advance Command MAC control element is shown in FIG. 66. The TAG Id field indicates the TAG Identity of the addressed TAG. The TAG containing the SpCell has a TAG Identity of 0. The length of the TAG Id field is 2 bits. The Timing Advance Command field indicates the index value $T_A$ (0, 1, 2 . . . 63) used to control the amount of timing adjustment that MAC entity has to apply. The length of the Timing Advance Command field is 6 bits. The DRX Command MAC CE, as specified by 3GPP TS 36.321, has a fixed size of zero bits.

Figure 75:
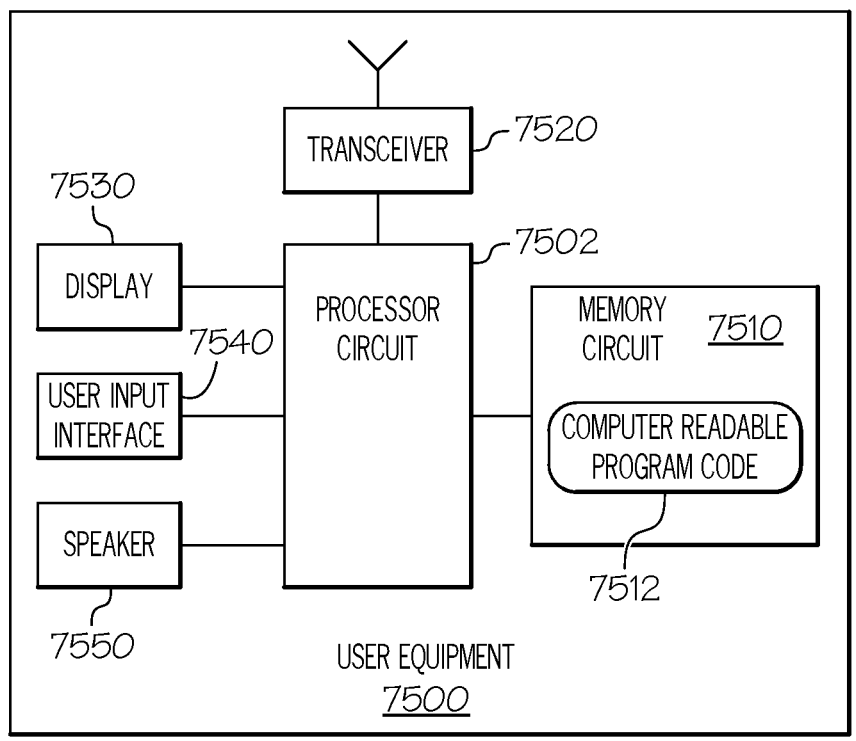
FIG. 75 is a block diagram of a UE, for use in a wireless communication network, that is configured to perform operations according to one or more embodiments disclosed herein.

FIG. 75 is a block diagram of a UE, for use in a wireless communication network, that is configured to perform operations according to one or more embodiments disclosed herein. The UE 7500 includes a transceiver 7520, a processor circuit 7502, and a memory circuit 7510 containing computer readable program code 7512. The UE 7500 may further include a display 75750, a user input interface 7540, and a speaker 7550.

The transceiver 7520 of FIG. 75 is configured to communicate with network nodes and may communicate with other UEs, through a wireless air interface using one or more of the radio access technologies disclosed herein. The processor circuit 7502 may include one or more data processing circuits, such as a general purpose and/or special purpose processor, e.g., microprocessor and/or digital signal processor. The processor circuit 7502 is configured to execute the computer readable program code 7512 in the memory circuit 7510 to perform at least some of the operations described herein as being performed by a UE.

Figure 76:
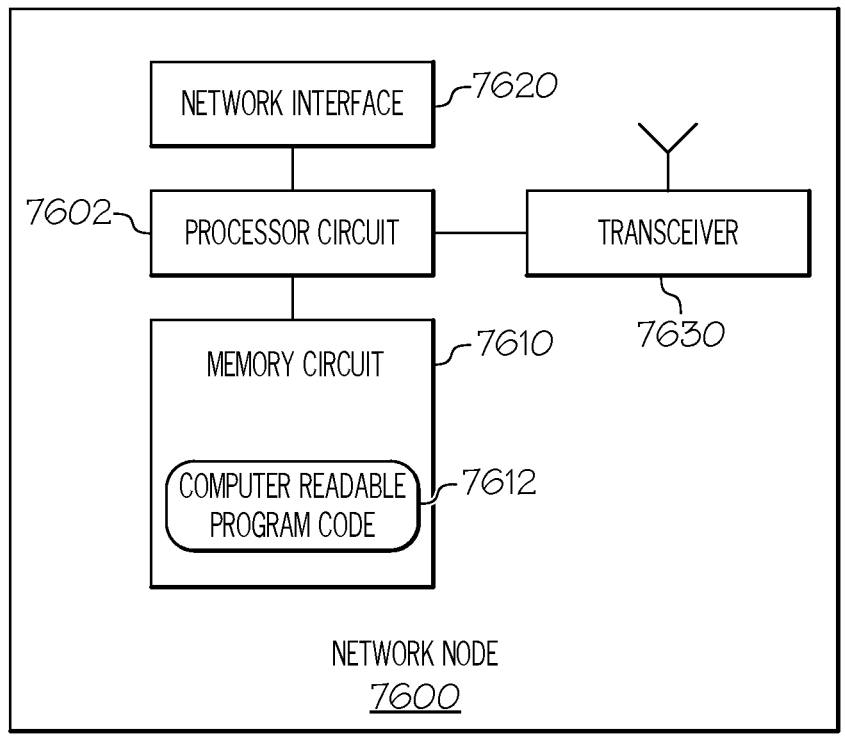
FIG. 76 is a block diagram of a network node, for use in a wireless communication network, that is configured according to one or more embodiments disclosed herein for a network node.

FIG. 76 is a is a block diagram of a network node 7600, for use in a telecommunications system, that is configured according to one or more embodiments disclosed herein for a network node. The network node 7600 can include a transceiver 7630 (e.g., when configured as a radio base station), a network interface 7620, a processor circuit 7602, and a memory circuit 7610 containing computer readable program code 7612.

The transceiver 7630 of FIG. 76 is configured to communicate with the UE 7500 using one or more of the radio access protocol operations disclosed herein. The processor circuit 7602 may include one or more data processing circuits, such as a general purpose and/or special purpose processor, e.g., microprocessor and/or digital signal processor, that may be collocated or distributed across one or more networks. The processor circuit 7602 is configured to execute the computer readable program code 7612 in the memory 7610 to perform at least some of the operations and methods of described herein as being performed by a network node. The network interface 7620 communicates with other network nodes and/or a core network.

Figure 77:
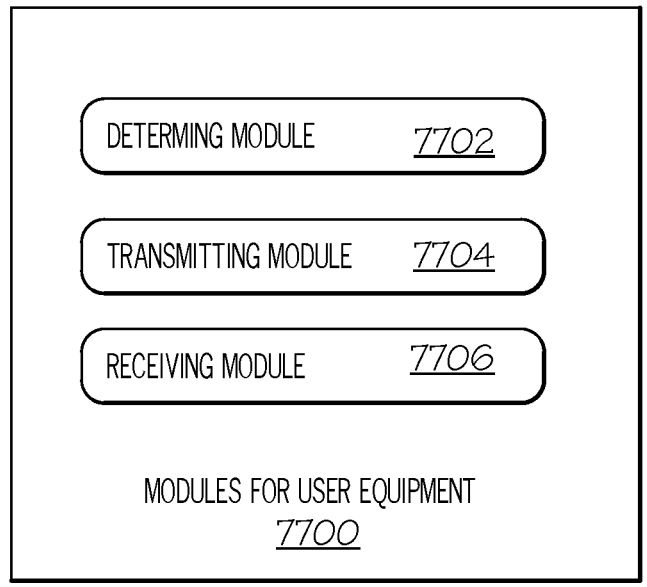
FIG. 77 illustrates modules residing in a UE, such as the UE of FIG. 75, that perform operations as disclosed herein according to some embodiments.

FIG. 77 illustrates modules residing in a UE 7700, such as the UE 7500 of FIG. 75, that perform operations as disclosed herein according to some embodiments. UE 7700 includes a determining module 7702, a transmitting module 7704, and a receiving module 7706. The determining module 7702 operates to configure the UE 7700 to determine that a Radio Resource Control, RRC, connection from the UE to a network node is operating in Connected Discontinuous Reception, CDRX, mode. The transmitting module 7704 operates to configure the UE 7700 to transmit, to the network node, in response to the determining that the RRC connection is operating in CDRX mode, an initial message comprising a Protocol Feature Type, PFT, and a User Equipment Type and Software Version Number, UE-TSVN. The receiving module 7700 operates to configure they usually 7700 to receive, from the network node, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a time alignment timer.

Figure 78:
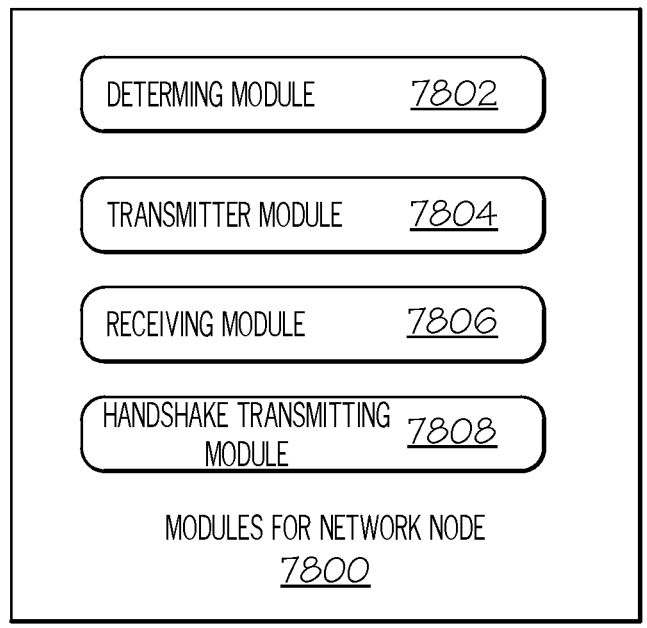
FIG. 78 illustrates modules residing in a network node, such as the network node of FIG. 76, that perform operations as disclosed herein according to some embodiments.

FIG. 78 illustrates modules residing in a network node 7800, such as the network node 7600 of FIG. 76, that perform operations as disclosed herein according to some embodiments. The network node 7800 includes a determining module 7802, an announcement transmitting module 7804, a receiving module 7806, and a handshake transmitting module 7808. The determining module 7802 operates to configure the network node 7800 to determine that a Radio Resource Control, RRC, connection from the network node to a UE is operating in Connected Discontinuous Reception, CDRX, mode. The announcement transmitting module 7804 operates to configure the network node 7700 to transmit, to the UE, in response to the determining that the RRC connection is operating in CDRX mode, an announcement message indicating a Network Type and Software Version Number, N-TSVN and indicating support for a Protocol Feature Type, PFT. The receiving module 7806 operates to configure the network node 7800 to receive, from the UE, in response to the announcement message, an initial message indicating support for a Protocol Feature Type, PFT, and indicating a User Equipment Type and Software Version Number, UE-TSVN. The handshake transmitting module 7808 operates to configure the network node 7800 to transmit, to the UE, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a Time Alignment Timer.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a user equipment, UE, for redefining a time alignment timer of a wireless communication network, the method comprising:
   determining that a Radio Resource Control, RRC, connection from the UE to a network node is operating in Connected Discontinuous Reception, CDRX, mode;
   transmitting, to the network node, in response to the determining that the RRC connection is operating in CDRX mode, an initial message comprising a Protocol Feature Type, PFT, and a User Equipment Type and Software Version Number, UE-TSVN; and
   receiving, from the network node, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a time alignment timer.

2. The method of claim 1, further comprising:
   applying the one or more values for redefining the time alignment timer in response to receiving a Time Alignment Command, TAC, from the network node.

3. The method of claim 1, wherein the determining that the RRC connection from the UE to the network node is operating in CDRX mode comprises:
   receiving, from the network node, an RRC Connection Reconfiguration message comprising an indication of the CDRX mode; and
   determining, based on the indication of the CDRX mode in the RRC Connection Reconfiguration message, that the network node is operating in CDRX mode.

4. The method of claim 1, further comprising:
   receiving, from the network node, an announcement message indicating support for the PFT and indicating a Network Type and Software Version Number, N-TSVN.

5. The method of claim 4, wherein the transmitting the initial message occurs responsive to determining that the UE is compatible with the N-TSVN supporting the PFT indicated by the announcement message.

6. The method of claim 4, wherein the announcement message is transmitted as part of an initial RRC Connection Reconfiguration message transmitted from the network node.

7. The method of claim 1, wherein the initial message further comprises a next field that indicates if a second byte in the initial message is the UE-TSVN.

8. A user equipment, UE, for operation in a wireless communication network, the user equipment comprising:
   a transceiver configured to provide radio communications with a network node of the wireless communication network;
   a memory configured to store computer executable instructions; and a processor coupled to the memory and to the transceiver, wherein the processor is configured to execute the computer executable instructions to perform operations comprising:
  determining that a Radio Resource Control, RRC connection from the UE to a network node is operating in Connected Discontinuous Reception, CDRX, mode;
  transmitting, to the network node, in response to the determining that the RRC connection is operating in CDRX mode, an initial message comprising a Protocol Feature Type, PFT, and a User Equipment Type and Software Version Number, UE-TSVN; and
  receiving, from the network node, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a time alignment timer.

9. The UE of claim 8, wherein the processor is further configured to execute the computer executable instructions to perform operations comprising:
  applying the one or more values for redefining the time alignment timer in response to receiving a Time Alignment Command, TAC, from the network node.

10. The UE of claim 8, wherein the determining that the RRC connection from the UE to the network node is operating in CDRX mode comprises:
  receiving, from the network node, an RRC Connection Reconfiguration message comprising an indication of the CDRX mode; and
  determining, based on the indication of the CDRX mode in the RRC Connection Reconfiguration message, that the network node is operating in CDRX mode.

11. The UE of claim 10, wherein the processor is further configured to execute the computer executable instructions to perform operations comprising:
  receiving, from the network node, an announcement message indicating a Network Type and Software Version Number, N-TSVN supporting the PIT.

12. The UE of claim 11, wherein the transmitting the initial message occurs responsive to determining that the UE is compatible with the N-TSVN supporting the PFT indicated by the announcement message.

13. The UE of claim 11, wherein the announcement message is transmitted as part of an initial RRC Connection Reconfiguration message transmitted from the network node to the UE.

14. The UE of claim 8, wherein the initial message further comprises a next field that indicates if a second byte in the initial message is the UE-TSVN.

15. A method by a network node serving a user equipment, UE, in a wireless communication network, the method comprising:
  determining that a Radio Resource Control, RRC connection from the network node to a UE is operating in Connected Discontinuous Reception, CDRX, mode;
  transmitting, to the UE, in response to the determining that the RRC connection is operating in CDRX mode, an announcement message indicating a Network Type and Software Version Number, N-TSVN and indicating support for a Protocol Feature Type, PFT;
  receiving, from the UE, in response to the announcement message, an initial message indicating support for a Protocol Feature Type, PFT, and indicating a User Equipment Type and Software Version Number, UE-TSVN; and
  transmitting, to the UE, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a Time Alignment Timer.

16. The method of claim 15, further comprising:
  transmitting, to the UE, a Time Alignment Command, TAC, to trigger applying the one or more values for redefining the Time Alignment Timer by the UE.

17. The method of claim 15, wherein the announcement message is transmitted as part of an initial RRC Connection Reconfiguration message transmitted from the network node to the UE.

18. The method of any of claim 15,
  wherein the initial message further comprises a Next field that indicates if a second byte in the initial message is the UE-TSVN.

19. The method of claim 15, further comprising:
  receiving, from the UE, a First Application Information, FAPPI, message comprising the PFT, a Next field that indicates the FAPPI message, and an uplink PMT field indicating a FAPPI message type.

20. The method of claim 19, wherein the FAPPI message is received from the UE responsive to the handshake message.

21. A network node serving a user equipment, UE, in a wireless communication network, the network node comprising:
  a transceiver configured to provide radio communications with the UE of the wireless communication network;
  a memory configured to store computer executable instructions; and
  a processor coupled to the memory and the transceiver, wherein the processor is configured to execute the computer executable instructions to perform operations comprising:
    determining that a Radio Resource Control, RRC, connection from the network node to a UE is operating in Connected Discontinuous Reception, CDRX, mode;
    transmitting, to the UE, in response to the determining that the RRC connection is operating in CDRX mode, an announcement message indicating a Network Type and Software Version Number, N-TSVN and indicating support of a Protocol Feature Type, PFT;
    receiving, from the UE, in response to the announcement message, an initial message comprising a Protocol Feature Type, PFT, and a User Equipment Type and Software Version Number, UE-TSVN; and
    transmitting, to the UE, in response to the initial message, a handshake message comprising the PFT, a downlink Protocol Message Type, PMT, indicating a Time Alignment Timer Definition, TATDEF, message type, and a Protocol Message Body, PMB, associated with the TATDEF message type that comprises one or more values for redefining a Time Alignment Timer.

22. The network node of claim 21, wherein the processor is further configured to execute the computer executable instructions to perform operations comprising:
  transmitting, to the UE, a Time Alignment Command, TAC, to trigger applying the one or more values for redefining the Time Alignment Timer by the UE.

23. The network node of claim 21,
wherein the announcement message is transmitted as part of an initial RRC Connection Reconfiguration message transmitted from the network node to the UE.

24. The network node of claim 21,
wherein the initial message further comprises a Next field that indicates if a second byte in the initial message is the UE-TSVN.

25. The network node of claim 21, wherein the processor is further configured to execute the computer executable instructions to perform operations comprising:
receiving, from the UE, a First Application Information, FAPPI, message comprising the PFT, a Next field that indicates the FAPPI message, and an uplink PMT field indicating a FAPPI message type.

* * * * *

UNITED STATES PATENT AND TRADEMARK OFFICE
CERTIFICATE OF CORRECTION

PATENT NO. : 11,082,933 B2  
APPLICATION NO. : 15/779207  
DATED : August 3, 2021  
INVENTOR(S) : Gunnar Bergquist It is certified that error appears in the above-identified patent and that said Letters Patent is hereby corrected as shown below:

In the Specification

In Column 7, Line 12, delete "equipped" and insert -- equipment --, therefor.

In Column 21, Line 35, delete "handing" and insert -- handling --, therefor.

In the Claims

In Column 32, Line 57, in Claim 6, delete "node." and insert -- node to the UE. --, therefor.

In Column 33, Line 42, in Claim 11, delete "PIT." and insert -- PFT. --, therefor.

In Column 34, Line 19, in Claim 18, delete "of any of" and insert -- of --, therefor.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*